US012627441B2

(12) United States Patent
Alawieh et al.

(10) Patent No.: US 12,627,441 B2
(45) Date of Patent: May 12, 2026

(54) SRS SOUNDING PROCEDURE FOR POSITIONING

(71) Applicant: Fraunhofer-Gesellschaft zur Förderung der angewandten Forschung e.V., Munich (DE)

(72) Inventors: Mohammad Alawieh, Erlangen (DE); Birendra Ghimire, Erlangen (DE); Ernst Eberlein, Großenseebach (DE); Norbert Franke, Erlangen (DE); Mohammad Momani, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 456 days.

(21) Appl. No.: 18/162,015

(22) Filed: Jan. 31, 2023

(65) Prior Publication Data

US 2023/0247446 A1 Aug. 3, 2023

Related U.S. Application Data

(63) Continuation of application No. PCT/EP2021/071809, filed on Aug. 4, 2021.

(30) Foreign Application Priority Data

Aug. 6, 2020 (EP) .................................... 20189866

(51) Int. Cl.
*H04L 5/00* (2006.01)
*H04W 16/28* (2009.01)
(52) U.S. Cl.
CPC ........... *H04L 5/0051* (2013.01); *H04W 16/28* (2013.01)

(58) Field of Classification Search
CPC .... H04W 16/28; H04L 5/0051; H04L 5/0023; H04L 5/0048; H04L 5/005; H04B 7/0695
See application file for complete search history.

(56) References Cited

U.S. PATENT DOCUMENTS

| | | | |
|---|---|---|---|
| 2018/0249453 A1 | 8/2018 | Nagaraja et al. | |
| 2021/0050889 A1* | 2/2021 | Park | H04B 7/0482 |
| 2023/0344589 A1* | 10/2023 | Shreevastav | H04L 5/0023 |

FOREIGN PATENT DOCUMENTS

| | | |
|---|---|---|
| EP | 3886484 A1 | 9/2021 |
| WO | 2020119727 A1 | 6/2020 |
| WO | 2021159407 A1 | 8/2021 |

OTHER PUBLICATIONS

3GPP TS 38.214 V16.1.0 (Mar. 2020), "3rd Generation Partnership Project; Technical Specification Group Radio Access Network; NR; Physical layer procedures for data (Release 16)" URL:http://www.3gpp.org/ftp/Meetings%5F3GPP%5FSYNC/RAN1/Docs/.

(Continued)

*Primary Examiner* — Eric Myers
(74) *Attorney, Agent, or Firm* — NKL LAW; Jae Youn Kim

(57) ABSTRACT

A user equipment (UE) configured for operating in a wireless communication network that supports a plurality of reference signals (RS) such as sounding reference signals, comprises a wireless interface configured for transceiving signals, comprising receiving a configuration signal having a configuration information indicating a reference spatial relation. The UE further comprises a controller for evaluating the configuration information and to determine the reference spatial relation. The UE is configured for using the reference spatial relation as a reference for an uplink RS (UL-RS) in the wireless communication network.

18 Claims, 15 Drawing Sheets

(56)          References Cited

OTHER PUBLICATIONS

3GPP TS 38.331 V16.0.0 (Mar. 2020), "3rd Generation Partnership Project; Technical Specification Group Radio Access Network; NR; Radio Resource Control (RRC) protocol specification (Release 16)".

3GPP TS 37.355 V16.0.0 (Mar. 2020), "3rd Generation Partnership Project; Technical Specification Group Radio Access Network; LTE Positioning Protocol (LPP) (Release 16)".

3GPP TR 38.901 V16.1.0 (Dec. 2019), "3rd Generation Partnership Project; Technical Specification Group Radio Access Network; Study on channel model for frequencies from 0.5 to 100 GHZ (Release 16)".

Ericsson, "Feature lead summary 2 on beam measurement and reporting", vol. RAN WG1, No. Sanya, China; Apr. 16, 2018-Apr. 20, 2018, Apr. 19, 2018 (Apr. 19, 2018), 3GPP Draft; R1-1805574 Feature Lead Summary 2 on Beam Management V2, 3rd Generation Partnership Project (3GPP), Mobile Competence Centre; 650, Route Des Lucioles; F-06921 Sophia-Antipolis Cedex; FR Retrieved from the Internet, Apr. 19, 2018.

* cited by examiner

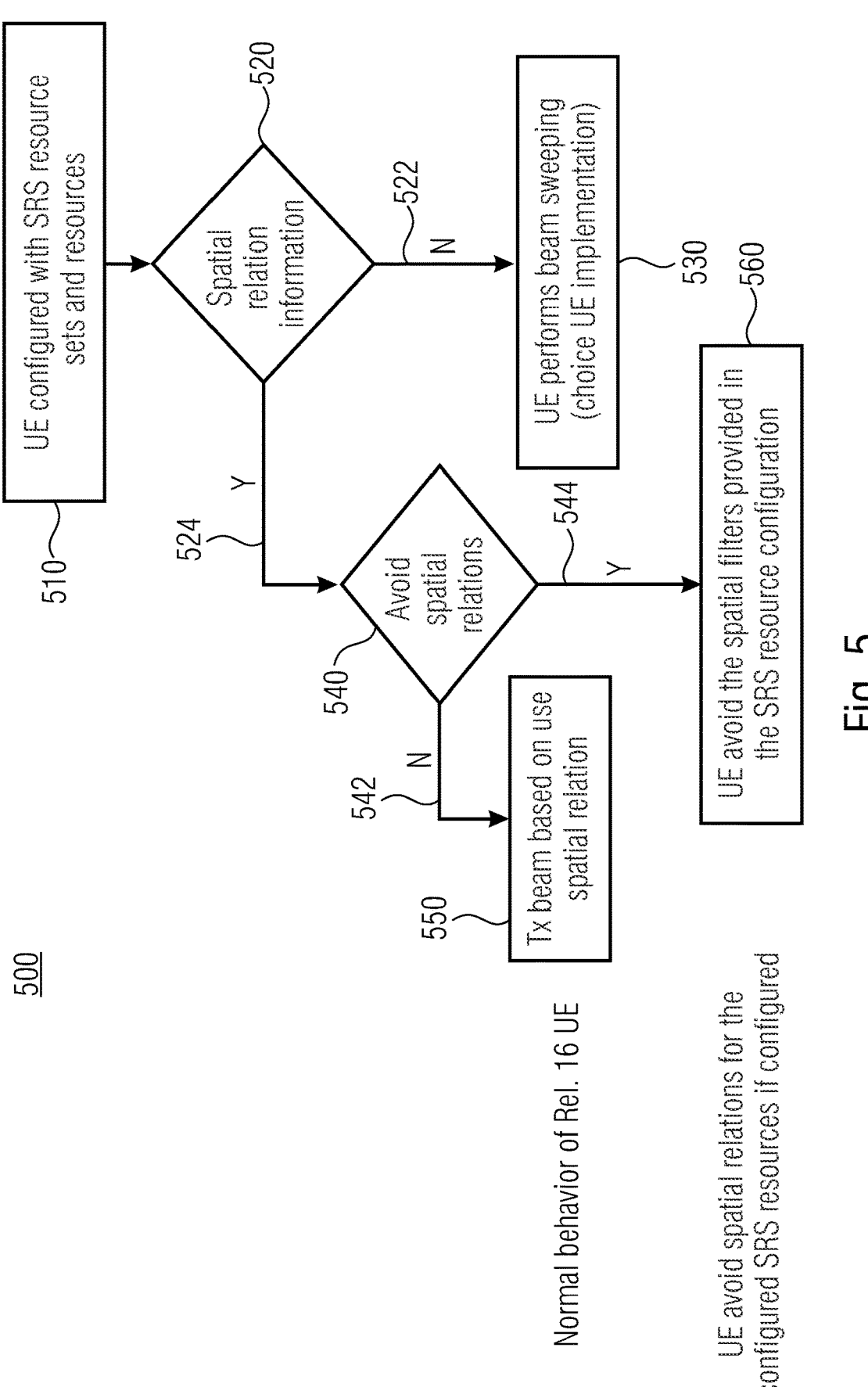

510 UE configured with SRS resource sets and resources

520 Spatial relation information

522 N

524 Y

530 UE performs beam sweeping (choice UE implementation)

560

540 Avoid spatial relations

544 Y

542 N

550 Tx beam based on use spatial relation

560 UE avoid the spatial filters provided in the SRS resource configuration

Normal behavior of Rel. 16 UE

UE avoid spatial relations for the configured SRS resources if configured

SRS SOUNDING PROCEDURE FOR POSITIONING

CROSS-REFERENCES TO RELATED APPLICATIONS

This application is a continuation of copending International Application No. PCT/EP2021/071809, filed Aug. 4, 2021, which is incorporated herein by reference in its a lot of resources if not optimized (i.e. the Tx and Rx combinations from the UE and gNBs).

In FIG. 13 the UE transmits a plurality of signals in different transmissions $T_i$ whilst the transmissions repeat for different beam settings of reception (Rx) beams of a serving base station (s-gNB) and a neighboring gNB (n-gNB 1). That is, FIG. 13 shows an uplink beam sweeping of release 16 of the standardization.

```
SRS-SpatialRelationInfoPos-r16 ::=      SEQUENCE {
    servingCellId-r16                       ServCellIndex     OPTIONAL,    -- Need S
    referenceSignal-r16                 CHOICE {
        ssb-IndexServing-r16                    SSB-Index,
        csi-RS-IndexServing-r16             NZP-CSI-RS-ResourceId,
        srs-SpatialRelation-16                  SEQUENCE {
            resourceSelection-r16                   CHOICE {
                srs-ResourceID-r16                      SRS-ResourceID
                srs-PosResourceID-r16                   SRS-PosResourceID-r16
        }
        uplinkBWP-r16                           BWP-Id
    },
    ssbNcell-r16                            SSB-InfoNcell-r16,
    dl-PRS-r16                              DL-PRS-Info-r16
    }}
``` entirety, and additionally claims priority from European Application No. EP 20 189 866.5, filed Aug. 6, 2020, which is incorporated herein by reference in its entirety.

BACKGROUND OF THE INVENTION

The present invention relates to a user equipment, to a controller entity, to a wireless communication network and for methods for operating devices described herein. The present invention in particular relates to a sounding reference signal (SRS) sounding procedure for a positioning.

For positioning within 5G, the sounding procedure can be performed in a way that UE transmits an UL (uplink) signal towards multiple gNBs or TRPs (Transmission reception points). The UL transmitted signal, for example SRS (Sounding Reference Signal) can be transmitted by the UE on multiple Tx beams. Two modes of operation are supported for UL sounding: the first is the NW (network) can provide the UE with information on the Tx spatial filter for SRS transmission used for a UL transmission or for a DL (downlink) signal reception. The second mode is to allow the UE to perform Tx sweeping: i.e. transmitting SRS signals on different beams in different directions.

According to the positioning sounding procedure in TS38.214, "If the UE is not configured with the higher layer parameter spatialRelationInfo the UE may use a fixed spatial domain transmission filter for transmissions of the SRS configured by the higher layer parameter SRS-for-positioning across multiple SRS resources or it may use a different spatial domain transmission filter across multiple SRS resources."

This means that a UE can be configured without spatial-RelationInfo on multiple SRS resources where the UE choses to use different spatial TX filters to perform beam sweeping or a fixed beam. The choice of the spatial filter is normally a UE implementation issue; this is shown for example in FIG. 1 for the TX beam sweeping case. From this figure, it can be seen that the sounding procedure consumes Thus, there is a need for an efficient positioning procedure.

It is, thus, an object of the present invention to provide for UEs, a controller entity, for wireless communication networks and for operating said devices that allow for an efficient positioning procedure.

SUMMARY

An embodiment may have a user equipment (UE) configured for operating in a wireless communication network that supports a plurality of reference signals (RS) such as sounding reference signals, the UE comprising: a wireless interface configured for transceiving signals, comprising receiving a configuration signal having a configuration information indicating a reference spatial relation; a controller for evaluating the configuration information and to determine the reference spatial relation; wherein the UE is configured for using the reference spatial relation as a reference for an uplink RS (UL-RS) in the wireless communication network.

Another embodiment may have a user equipment (UE) configured for operating in a wireless communication network that supports a plurality of reference signals (RS) such as sounding reference signals, the UE comprising: a wireless interface configured for transceiving signals; wherein the UE is configured for transmitting UL-RSs on at least a first time instant and a later second time instance and for using, at the first time instance the UL-RS along a default direction based on a channel condition of the UE, e.g., based on a hampered transmission, and for updating the reference spatial relation for the second time instance based on a changed channel condition.

Another embodiment may have a controller entity configured for controlling at least a part of an operation of a wireless communication network that supports a plurality of reference signals (RS) such as sounding reference signals, wherein the wireless communication network is adapted to communicate with a user equipment (UE), the controller entity being configured for: determining a filter information indicating at least one spatial filter to be used by the UE to transmit an uplink-RS; transmitting an indicator signal to the UE, the indicator signal comprising the filter information.

According to an embodiment, a user equipment (UE) is configured for operating in a wireless communication network that supports a plurality of reference signals (RS) such as sounding reference signals, comprises a wireless interface configured for receiving signals, transceiving a signal comprising receiving a configuration signal having a configuration information indicating a reference spatial relation. The user equipment comprises a controller for evaluating the configuration information and to determine the reference spatial relation. The UE is configured for using the reference spatial relation as a reference for an uplink RS (UL-RS) in the wireless communication network. This may allow to provide the UE directly with a spatial relation so as to avoid at least parts of reference signals to determine the reference spatial relation and, thus, for an efficient determination of the position.

According to an embodiment, a UE is configured for operating in a wireless communication network that supports a plurality of reference signals (RS) such as sounding reference signals. The UE comprises a wireless interface configured for transceiving signals. The UE is a second UE and is configured for receiving a signal indicating an uplink reference signal from a first UE and for transmitting the uplink-reference signal on behalf of the first UE signal from a first UE and for transmitting the UL-RS on behalf of the first UE. This may allow to select a different route for the UL-RS and thus to avoid unnecessary transmissions, thereby enhancing efficiency of a determination of a position.

According to an embodiment, a user equipment (UE) is configured for operating in a wireless communication network that supports a plurality of reference signals (RS) such as sounding reference signals. The UE comprises a wireless interface configured for transceiving signals, wherein the UE is capable of beam forming with the wireless interface so as to form different beams. The UE is adapted to use a first plurality of resource sets for transmitting a second plurality of UL-RS, each resource set having at least one resource for transmitting a UL-RS of the plurality of UL-RS. The UE is configured for performing a power control of a transmission power for transmitting the UL-RSs individually for a first resource set of the plurality of resource sets and a second resource set of the plurality of resource sets. This may allow for individually performing power control in different resource sets, therefore avoiding or preventing at least in parts a re-transmission of reference signals based on too low or too high power that may lead to failures in reception at the receiver of the signal. Thereby, efficiency of the network may be enhanced.

According to an embodiment, a controller entity configured for controlling at least a part of an operation of a wireless communication network that supports a plurality of reference signals (RS) such as sounding reference signals, is adapted to communicate with a user equipment (UE), the controller entity being configured for determining filter information indicating at least one spatial filter to be used by the UE to transmit an uplink-RS. The controller entity is configured for transmitting an indicator signal to the UE, the indicator signal comprising the filter information.

Further embodiments provide for a wireless communication network providing at least one UE and a controller entity. Further embodiments relate to methods for operating such devices and to a computer program.

BRIEF DESCRIPTION OF THE DRAWINGS

Embodiments of the present invention will be detailed subsequently referring to the appended drawings, in which:

FIG. 5 shows a schematic flowchart of a method according to an embodiment;

DETAILED DESCRIPTION OF THE INVENTION

Figure 1:
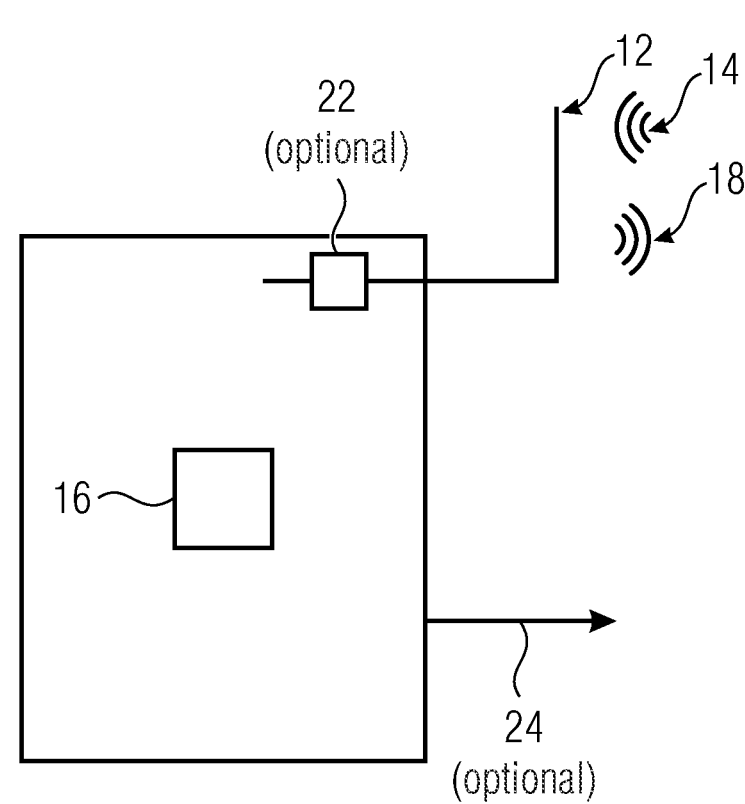
FIG. 1 shows a schematic block diagram of a user equipment, UE, configured for operating in a wireless communication network, according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Some embodiments of the present invention that are described herein relate to positioning in a wireless communication network, i.e., to estimate or determine a position of a device, e.g., a user equipment (UE) in the wireless network. Some embodiments make use of transmitting a reference signal (RS), e.g., a sounding reference signal (SRS). Other reference signals that may be transmitted may include, for example, demodulation RS (DMRS), e.g., together with data with a UE. Reference signals may be received with one or more transmission and reception points (TRP) i.e., embodiments may relate to signal-TRP and multi-TRP communication. Multi-TRP communication may be used, for example, in ultra-reliable low latency communication (URLLC). RS may be used for positioning, i.e., to determine a position of the source of the RS in the wireless communication network. However, such RS may be sued without limitation to establish and/or maintain communication links within a wireless communication network, e.g., in said single-TRP or multi-TRP communication.

Especially in case of beam forming using narrow beams establishing spatial relations for many UE⇔TRP links may be a complex procedure. In dense deployments each TRP may serve a small area only and the selected beams for this TRP may focus on this area. Opposed to this for positioning or multi-TRP communication, a TRP shall transmit or receive signal to a wide area and where the wide area comprises multiple TRPs. The network can select the spatial filter to be used by the UE (within the SRS resource configuration) by one of the following options Assuming beam correspondence by selecting a DL-RS (supported by Rel 16) as reference.

Selecting the same filter as used for other uplink transmissions (supported by Rel 1.6)

Leave it up to the UE (=don't specify the spatial relationship) (for Rel 16 the UE performs beam sweeping if the spatial relationship is not given)

Provide assistance data (NEW, one of the main scope of this invention)

Working assumption: At least one spatial relation for the SRS resource and resource set configuration is available which similar to the Rel-16 behavior.

For UE beam UL-SRS transmission with no spatial relation configuration, there exists 3 options:

1. UE performs beam sweeping where the number of Tx beams are defined by the number of SRS resources within a resource set 2. UE selects the beam in directions different (with different spatial filters) to one or more known (at NW) spatial relation 3. UE is configured to select the Tx beams in a preconfigured direction with respect to a spatial relation (example from the serving TRP or/and second TRP or an SRS signal)

The scope of this IR is to define that the procedure to options 2. and 3. more specifically the SRS resource spatial information and the Power control settings; option 1. is the Rel-16 procedure and is hence state of the art.

The inventors have found that the current procedures adapted from 3GPP Rel-15 are serving gNB oriented, or in other words are not designed to support an efficient sounding procedure with the neighboring gNBs or TRPs. The choice of the spatial filters used are normally a UE implementation issue, however the NW does not currently provide the necessary signaling for the UE to perform the desired behavior.

The inventors have found that the current procedure has on positioning the following drawbacks:

NW cannot configure a UE Tx beam not provided with SRS-SpatialRelationInfoPos-r16:

The NW cannot configure to UE to transmit an SRS resource within a specific configuration for example in the direction of a specific TRP or to avoid transmitting in the direction of a specific TRP to limit interference.

Inefficient SRS sounding procedure:

For a combination of beam sweeping and spatial relation configuration. From a realistic scenario, the UE can receive one or more DL-RSs (downlink reference signals) and be indicated to use one of these RSs spatial relation information for UL transmission. Tx beam sweeping is performed then to reach far away TRPs, however the direction of the TX beams are advantageously configured in a different direction to that of SRS with spatial relation When the UE is not configured with spatial relation information:

the choice of the fixed Tx beam or beam sweeping is not known at the network; when the SRS-SpatialRelationInfoPos-r16 is not configured it is left to the UE to decide on the beam selection for the SRS resources Embodiments target to and provide for solutions to Reduce the number of reference signals required for establishing the spatial relationship Better support of modes where beam correspondence is not valid, e.g., beams used for transmit and receive have different characteristics Support beam forming towards reception points (RP) not transmitting a reference signal.

FIG. 1 shows a schematic block diagram of a user equipment (UE) 10 configured for operating in a wireless communication network that supports a plurality of reference signals (RS), e.g., sounding reference signals (SRS). UE 10 comprises a wireless interface 12 configured for transceiving signals. Transceiving signals may relate to transmitting and/or receiving signals. The UE 10 is configured for receiving a configuration signal 14, the configuration signal 14 comprising configuration information indicating a reference spatial relation. UE 10 comprises a controller 16 for evaluating the configuration information and to determine the reference spatial relation. The UE 10 is configured for using the reference spatial relation as a reference for an uplink RS (UL-RS) 18 in the wireless communication network.

That is, the UE may directly be provided with information indicating the reference spatial relation. This may allow to avoid efforts, especially in view of transmitting signals, for determining the reference spatial relation at the UE. Thereby, a low network load and/or a high efficiency may be obtained.

The UE 10 may be configured for transmitting the UL-RS 18 using a spatial TX filter 22 and for determining the spatial TX filter based on the reference spatial relation. For example, the spatial TX filter 22 may be one of a plurality of filters or filter settings to be applied to transmit the signal towards a specific direction obtain with the spatial TX filter 22. The UE 10 may alternatively or in addition be configured for transmitting a plurality of UL-RS including signal 18 along a plurality of associated different directions by applying different spatial TX filters. UE 10 may be configured for excluding a UL-RS associated with a direction that is associated with the reference spatial relation from transmission. That is, alternatively or in addition to transmit UL-RS 18 towards a specific direction, the specific direction indicated with the TX filter 42 may be avoided from transmission.

UE 10 may be configured for receiving instructions, e.g., with the configuration signal 14 or a different signal, for using at least one resource set for transmitting UL-RS 18. Each resource set available may comprise at least one resource. UE 10 may be configured for transmitting at least the UL-RS 18 in accordance with the instructions. That is, UE may be configured with a higher layer configuration comprising one or more resources and one or more resource sets. The UE may be configured to transmit the one or more UL-RSs of the one or more resources.

The instructions may alternatively or in addition indicate a direction to be avoided. That is, with the configuration signal the instructions may be received that indicate to avoid a use of at least one resource of at least one resource set, each resource set having at least one resource. In different terms, the configuration signal 14 or the signal being used for transmitting the instructions may indicate resources to be used and/or resources to remain unused for transmitting UL-RSs.

For example, the UE may be configured for receiving information indicating a downlink (DL)-RS or a UL-RS of a cell of the wireless communication network, the information being received from at least one transmission point (TP), e.g., a transmission reception point (TRP). The UE may be configured to avoid transmission of the UL-RS into a direction corresponding to be indicated DL-RS or UL-RS of the cell. The DL-RS can be transmitted by one or more TRPs, while the UL-RS is transmitted by the UE. A cell may be understood as at least a section of the wireless communication network being optionally operated by a base station.

According to an embodiment, the device 10 may be configured for transmitting a signal 24 indicating the UL-RS to another UE so as to instruct the other UE to transmit the UL-RS being indicated in the signal 24 on behalf of UE 10. Signal 24 may be transmitted within the frequency range and/or schedule of the wireless communication network UE 10 operates in but may also be transmitted by use of a sidelink interface and a sidelink channel. For example, the signal 24 may indicate the resources and/or spatial filters to be used, which may be done explicitly or implicitly so as to allow the receiving device, e.g., UE to determine, provide and transmit the indicated signal, e.g., using a database, on calculations or the like. Instead of instructing a different UE, any other device being able to transmit the UL-RS may be instructed, e.g., a TRP, a base station or the like.

That is, the UL-RS can correspond to an UL-RS from the same UE or to an UL-RS from a different UE. This allows for the advantage that the same UE scenario is possible as well as allowing that an UL-RS from a second UE to be relevant for inter-UE communication between UEs which may be used for a so-called sidelink or for cross link interference application. In 3GPP notation the signal may be an SL-RS (sidelink reference signal) or UL-RS.

1. Solution/Approach (3)

For the main scenario in the present embodiment, the NW wants to configure the UE to transmit one or more UL-RS(s) which is/are intended to be received by multiple TRPs. In this case, the UE is configured by the NW with a number of UL resources without a spatial relation indication (i.e. the NW does not tell the UE on the Tx spatial to use for the UR-RS transmission for a given resource). A NW configuration to a UE is useful to get a desired transmission for multi-TRP communication or positioning.

For providing this configuration, embodiments propose, e.g., in section 1.1, to use one or more spatial filter (Rx derived from DL-RSs or Tx derived from UL-RSs) information as reference for configuring of an UL transmission (ex. SRS). Based on this reference configuration The NW provides the UE with higher layer parameters to perform UL transmission in relation to the spatial filter information (reference spatial filters) to avoid the UL-RS transmission on one or more provided spatial filters (details in Section 1.1), AND/OR The NW provides the UE with higher layer parameters on a directional information and resource configuration to use for UL transmission (details in Section 1.2)

Additionally, the NW can further configure the power setting for the uplink transmission and additional resource configuration which are more relevant for the method in Section 1.2.

1.1 Using One or More Spatial Filter (Rx or Tx) Information as Reference for Configuring of an UL Transmission Defining the Reference Spatial Relation:

The reference spatial relation is used to configure the spatial setting for the target UL-RS transmission when the higher layer parameter spatialRelationInfo is not configured for the target UL-RS. The reference spatial relation provides a spatial relation between a reference RS and the target UL-RS, where the higher layer parameter of the reference spatial relation, if configured, contains the ID of the reference RS.

If the reference spatial relation is not configured, the UE assumes the reference spatial relation is the Rx spatial filter obtained from the SS/PBCH block of the serving cell that the UE uses to obtain MIB.

The reference spatial relation is providing a reference for the target UL-RS transmission and unlike spatialRelationInfo, the UE is not expected to transmit target UL-RS within the spatial filter information of the reference RS. The UE shall not transmit the target SRS resource with the same spatial domain transmission filter used for the reception of the reference CSI-RS, SS/PBCH block, or a DL PRS or the transmission of an SRS-for-positioning.

When the configuration of UL-RS is done by the higher layer parameter SRS-for-positioning or SRS-Config, the UE can only be provided with one or more reference spatial relation of a single RS source. The UE is not expected to be configured with spatialRelationInfo and reference spatial relation for the same target UL-RS within one resource. If the UE both spatialRelationInfo and reference spatial relation are configured, the UE assumes that reference spatial relation is the fallback configuration for the case that spatialRelationInfo cannot be configured by the UE (DL-RS cannot be detected or source UL-RS is blocked).

Figure 2B:
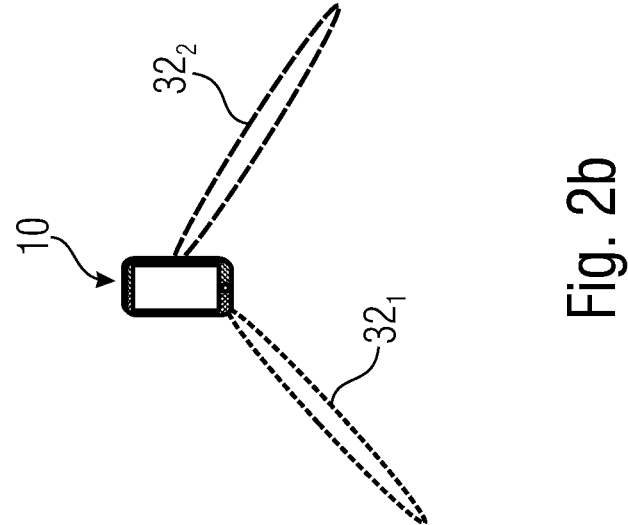
FIG. 2b a scenario in a wireless communication network according to an embodiment where uplink reference signals (UL-RSs) are transmitted by the UE.
Figure 2A:
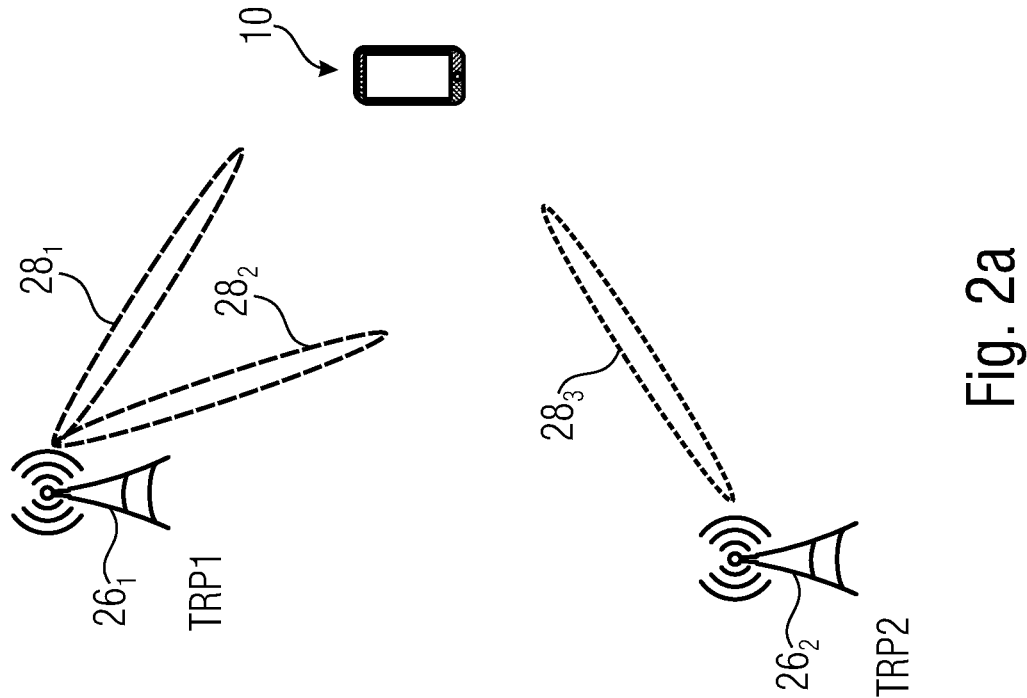
FIG. 2a a scenario in a wireless communication network according to an embodiment, where one or more transmission reception points (TRP) and may transmit one or more downlink (positioning) reference signals.
Figure 2C:
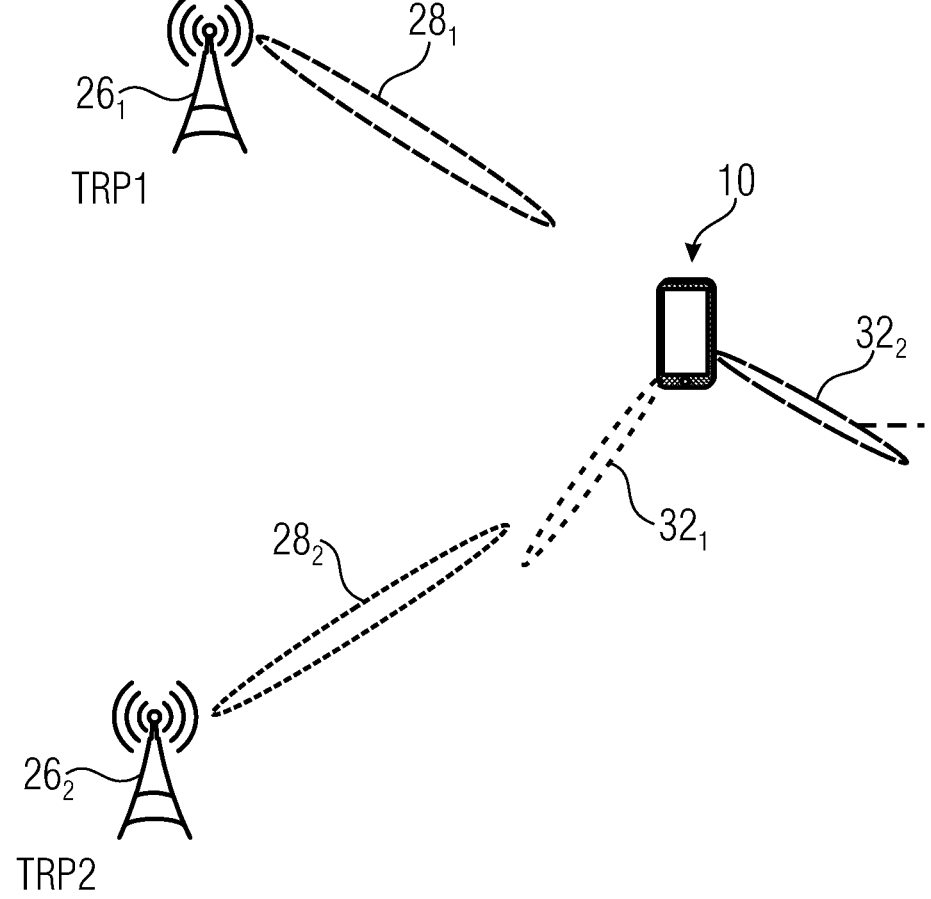
FIG. 2c a scenario in a wireless communication network according to an embodiment combining the scenarios of FIG. 2a and FIG. 2b.

The reference spatial relation can be related to an SRS configured by the higher layer parameter SRS-Config or SRS-for-positioning, CSI-RS, SS/PBCH block, or a DL PRS configured on a serving cell or a SS/PBCH block or a DL PRS configured on a non-serving cell. The reference spatial relation can be determined (as shown in FIG. 2*a*-2*c*) based on:

FIG. 2*a* In FIG. 2*a*, one or more transmission reception points (TRP) 26₁ and 26₂ may transmit one or more downlink (positioning) reference signals 28₁, 28₂ and/or 28₃. DL-RS(s) transmitted from one more TRPs: The reference spatial filter is for the UE based on the receiver information (Rx-spatial filter) used to receive the DL-RS (s). The NW informs the UE in this case to use the DL-RS as a reference for the UL-RS transmission.

Where the DL-RS can be a CSI-RS, SS/PBCH block, or a DL PRS configured on a serving cell or a SS/PBCH block or a DL PRS configured on a non-serving cell FIG. 2b UL-RS(s) transmitted by the UE: The reference spatial filter is for the UE based on the transmit information (Tx-spatial filter) used to transmit on or more the UL-RS. The NW informs the UE in this case to use the UL-RS as a reference for other UL-RS transmission.

In some scenarios, the UE has no DL-correspondence information to a second gNB or TRP, reason can be for example, that the SSB from the n-gNB cannot be received or the RP (reception point) has no transmit capabilities.

For example, a UE according to an embodiment, e.g., UE 10 may transmit one or more UL-RS 32$_1$ and 32$_2$, wherein a number of transmitted signals may be at least 1, at least 2, at least 3, at least 4, at least 5 or even a higher number, e.g., 16. The UL-RS 32$_1$ and/or 32$_2$ may be, for example, an uplink sounding reference signal (UL-SRS). For example, the UL-RS 32$_1$ and/or 32$_2$ may correspond to the UL-RS 18.

FIG. 2c shows a combination of UL-RS and DL-RS information.

A number of signals transmitted by TRP 26$_1$, TRP 26$_2$ and/or UE 10 may have any number of at least 1.

In other words, FIGS. 2a-2c show examples for a reference beam identification.

Figure 11:
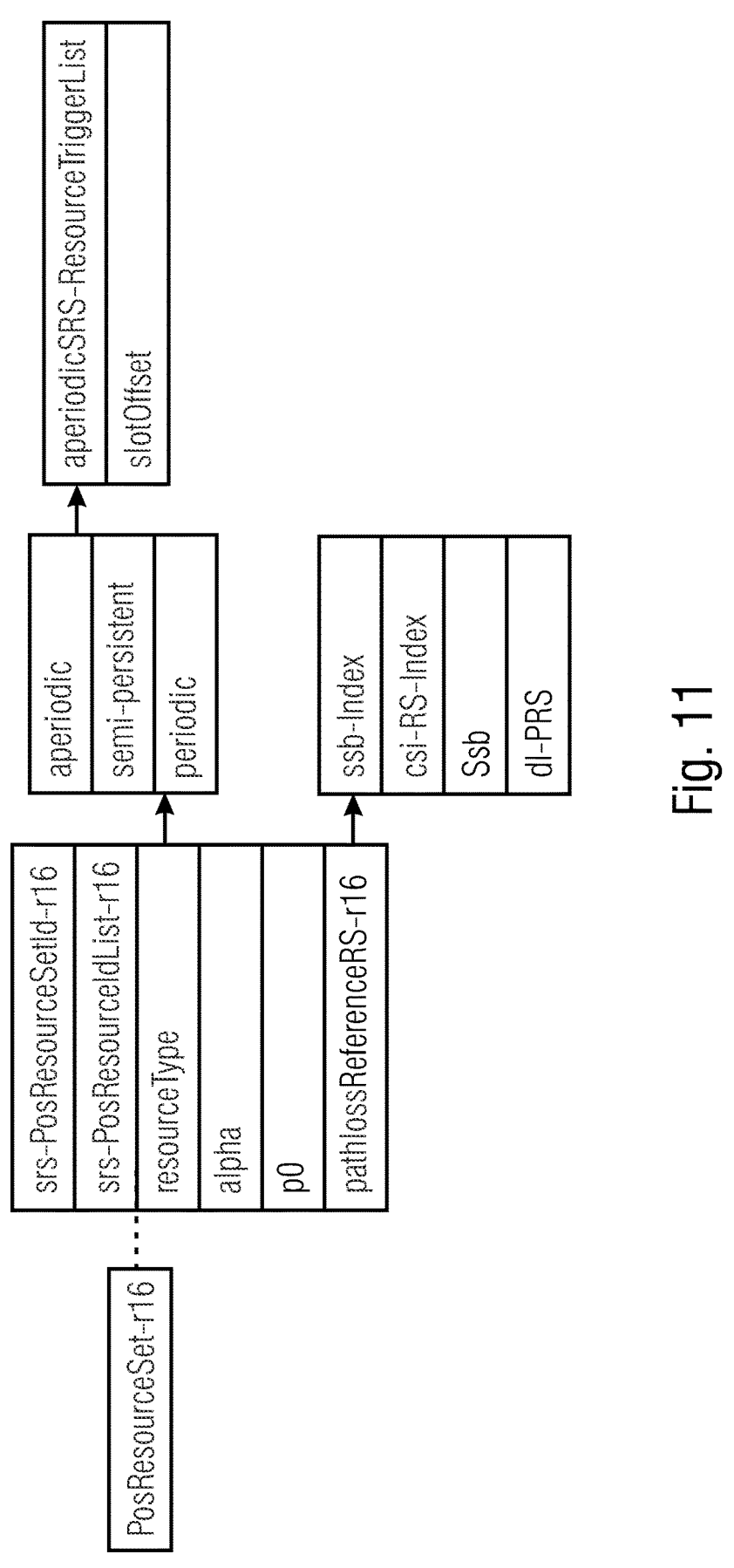
FIG. 11 shows a known positioning SRS-resource set definition according to release 16.
Figure 12:
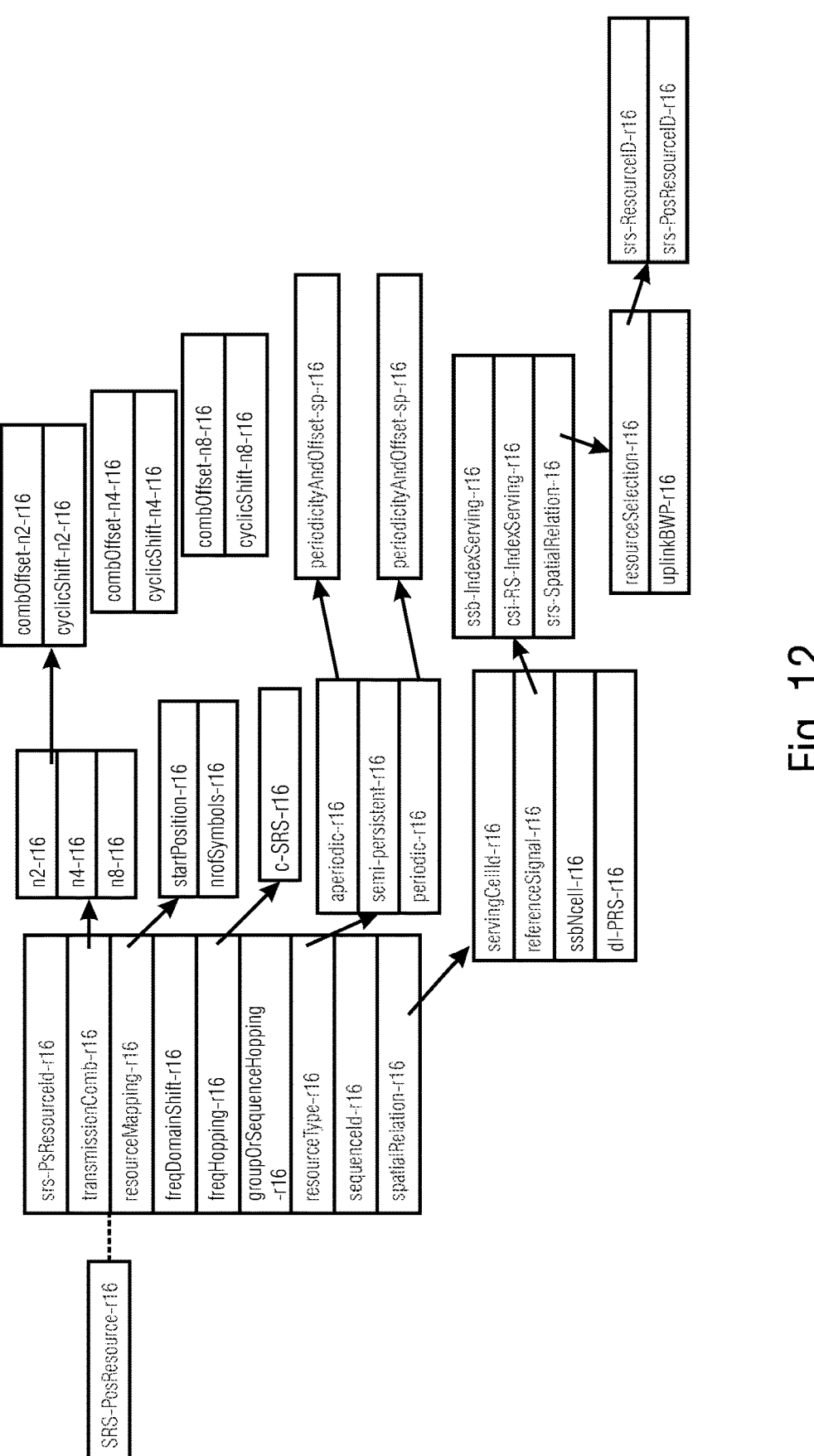
FIG. 12 shows a known positioning SRS-resource definition according to release 16.

For example, a respective configuration may be obtained by implementing commands and/or signaling that may be represented by the following pseudo code showing an example of a resulting higher layer parameter that can be defined as a field in referenceSpatialRelation-R17:

known configuration of SRS resources and/or SRS resource sets is provided in connection with FIG. 11 and FIG. 12.

Figure 3:
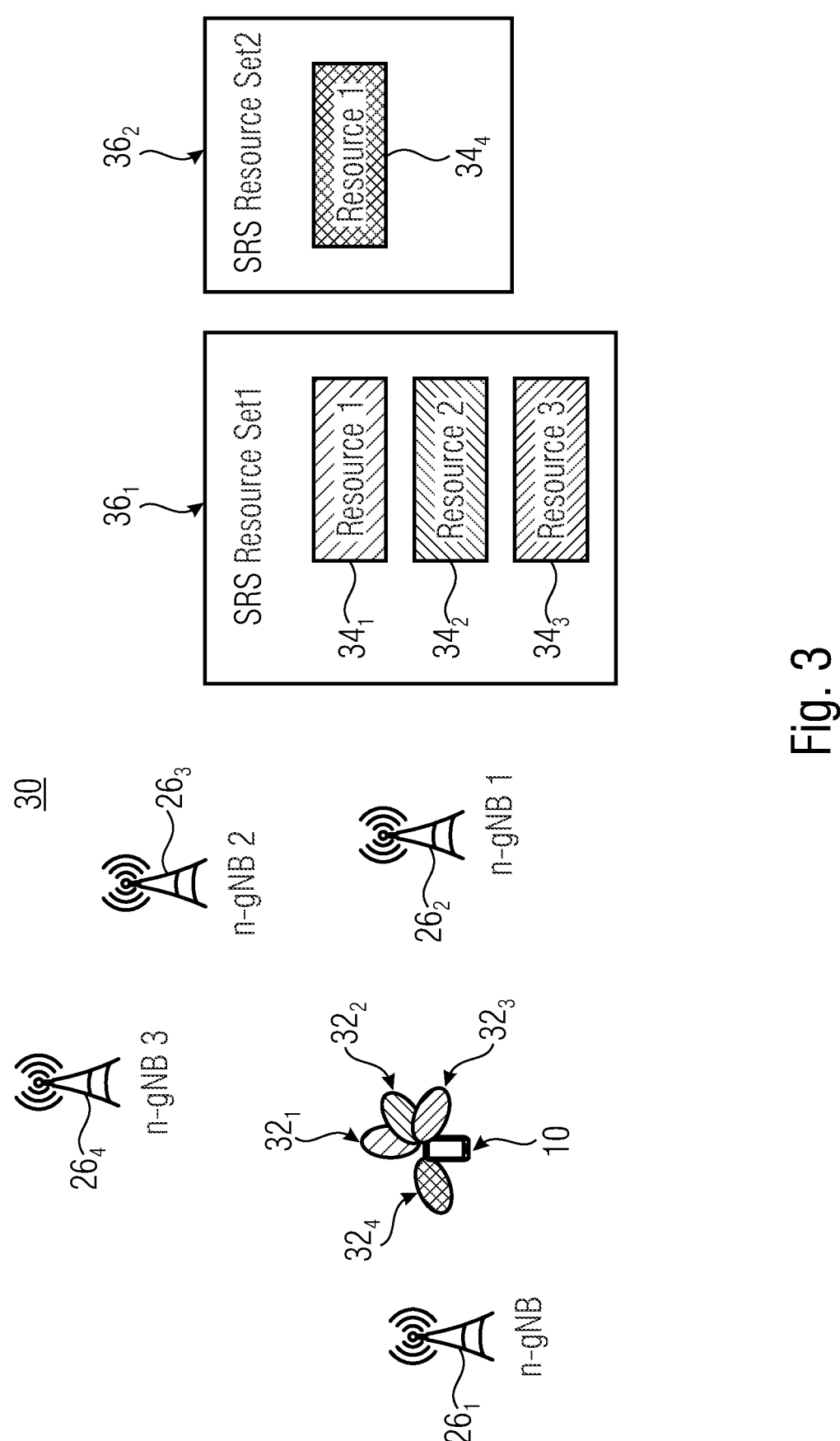
FIG. 3 shows a schematic block diagram of an example wireless communication network according to an embodiment.
Figure 4:
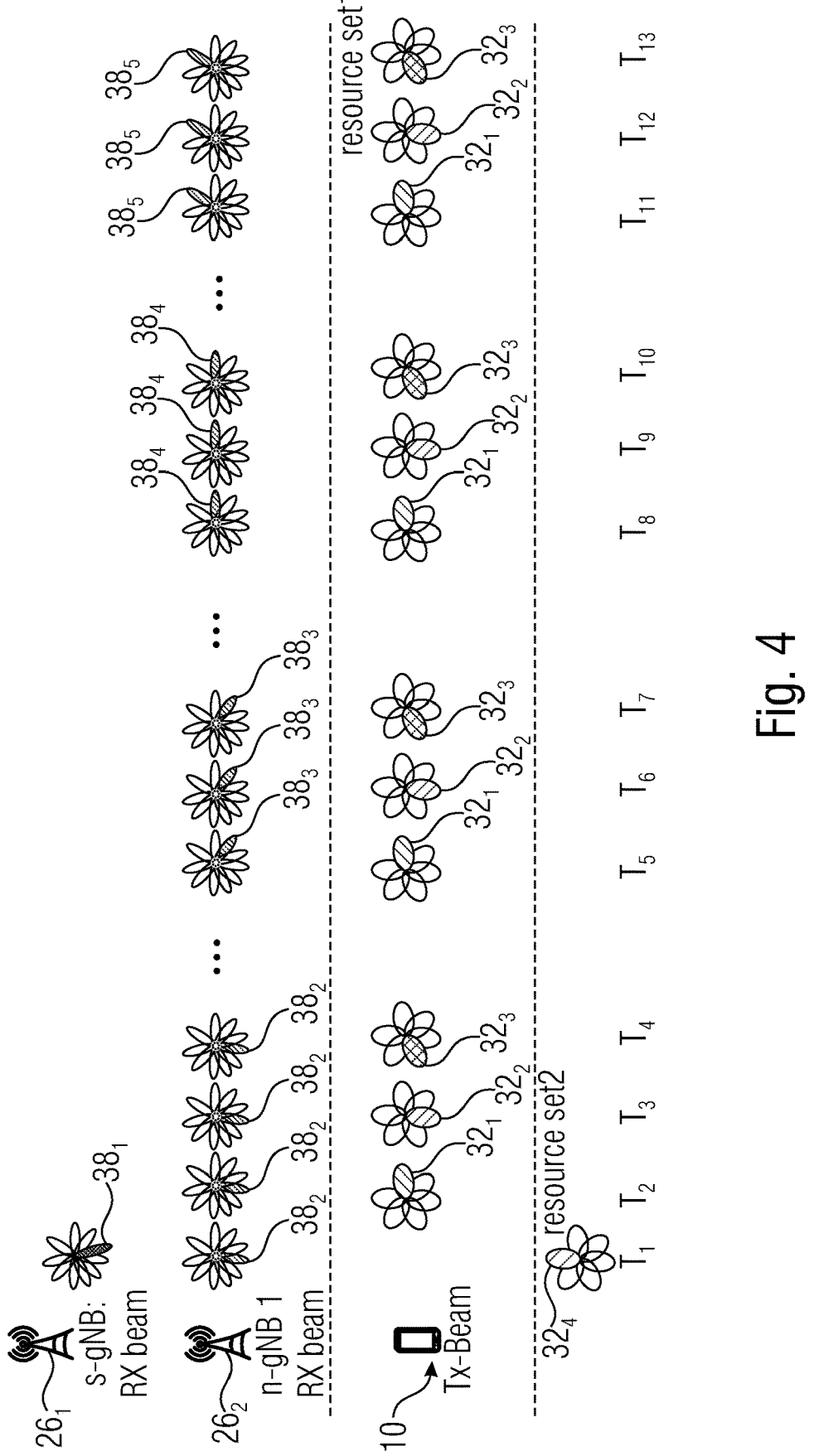
FIG. 4 shows a schematic block diagram of an example wireless communication network according to an embodiment implementing a UE UL beam selection assuming DL-beam correspondence with s-gNB.

As shown in the schematic representation of transmissions T$_1$ to T$_{13}$ in FIG. 4, resource set two of FIG. 3 may be used to direct a UL-RS 32$_4$ towards the serving gNB 26$_1$ that forms a respective Rx beam 38$_1$.

TRP 26$_2$ may continue to form Rx beams 38$_2$, . . . , 38$_n$, for example, a number of 4 Rx beams are illustrated. UE 10 may sweep its Tx beams, e.g., transmitting UL-RS 32$_1$ to 32$_3$ using different resources so as to obtain different directions of the signal, whilst avoiding additional transmissions to the s-gNB 26$_1$. That is, FIG. 4 shows a UE UL beam selection assuming DL-beam correspondence with s-gNB only. In FIG. 4, the network configures the UE 10 with two UL SRS resource sets, e.g., the resource sets 36$_1$ and 36$_2$ illustrated in FIG. 3. Resource set 36$_1$ may be configured with no spatial relation to avoid a spatial relation to an SSB (synchronization signal block), e.g., SSB$_i$. The network further configures the UE 10 with resource set 36$_2$ that may be configured with a spatial relation SSB$_i$.

1.1.1 the NW Provides the UE with Higher Layer Parameters to Perform UL Transmission(s) in Relation to the Spatial Filter Reference As provided in the previous section The UE is assumed to have at least one reference spatial relation for target UL-RS transmissions based on a DL-RS measurements from one or more TRPs, or on reports received for UL-RS transmission or both.

This involves the following steps:

The UE is configured with a higher layer configuration comprising one or more resources and one or more resource sets. The UE is configured to transmit the one or more UL-RS(s) of the one or more resource(s).

```
referenceSpatialRelation-r17 ::=    SEQUENCE {
    servingCellId-r16                  ServCellIndex      OPTIONAL,   -- Need S
    referenceSignal-r16                CHOICE {
        ssb-IndexServing-r16               SSB-Index,
        csi -RS-IndexServing-r16           NZP-CSI-RS-ResourceId,
        srs-SpatialRelation-16             SEQUENCE {
            resourceSelection-r16              CHOICE {
                srs-ResourceID-r16                 SRS-ResourceID
                srs-PosResourceID-r16                  SRS-PosResourceID-r16
        }
        uplinkBWP-r16                      BWP-Id
},
    ssbNcell-r16                       SSB-InfoNcell-r16,
    dl-PRS-r16                         DL-PRS-Info-r16
}}
```

FIG. 3 shows a schematic block diagram of an example wireless communication network 30 according to an embodiment. In the illustrated scenario, UE 10 is shown as well as TRPs 26$_1$-26$_4$. For example, TRP 26$_1$ may form at least a part of a serving gNB (s-gNB). TRPs 26$_2$, 26$_3$ and 26$_4$ may, for example, be at least a part of neighboring gNBs, n-gNB.

Resources 34$_1$, 34$_2$ and 34$_3$ used for transmitting UL-RS 32$_1$, 32$_2$, 32$_3$ respectively, may form at least a part of a resource set 36 which may be referred to as SRS resource set. UL-RS 32$_4$ may be transmitted by use of a resource 34$_4$ which may be at least a part of an SRS resource set 36$_2$, wherein each resource set 36$_1$ and 36$_2$ comprises at least one resource. However, one or more resource sets 36$_1$ and 36$_2$ may comprise a higher number of resources that may be equal or different when compared to other resource sets. A The NW configures the UE through one or higher layer parameters to avoid transmitting one or more UL-RS(s) to a specific direction.

This can be to configure the UE to avoid transmitting on the reference beam itself or on a set of beams with the relation information to the reference (example QCLed RS)

This can be achieved by a new IE (information element) AvoidSpatialRelationInfoPos within an SRS resource or an SRS resource set. The IE includes the details on the UL or DL RS from a serving or neighbouring cell. The UL signal reference can be an SRS associated with a resource or resource set ID of an SRS for MIMO srs-ResourceID-r16 (i.e. communication usage) or SRS for positioning srs-PosResourceID-r16. The DL reference signal can an SSB (ssb-IndexServing-r16/ssbNcell-r16), CSI-RS (csi-RS-IndexServing-r16), or DL-PRS dl-PRS-r16 from a serving or neighbouring cell.

Two main advantages when the target UL-RSs is not transmitted as the reference spatial relations is:

The NW can reduce interference for a given area. Combined with the power control setting the NW can guarantee that the UL-RSs are causing interference in defined directions The NW may have already a link established between the UE and one or more TRPs. The NW can configure the UE to avoid sweeping in the direction of the established links and hence the reduce UE and TRP power consumption as well as increase the air usage efficiency. AvoidSpatialRelationInfoPos example to ensure that the position measured with the SBP (single base station positioning) is consistent with measurements using several gNB The network may configure the resource sets periodically, aperiodically or in a semi-persistent way. The UE 10 having detected the SIB of s-gNB 26₁ may thereby determine or obtain information indicating the pathloss to this TRP. It may therefore avoid transmission of signals towards this direction such that transmission of signal 32₁ is optional. For cases where the UE does not have spatial information and/or pathloss information, it may transmit the signals 32₂ to 32₄ along those directions. For example, if for one or more of those direction or spatial directions, a pathloss information is available, the UE 10 may additionally exclude such signals from being transmitted.

```
SRS-AvoidSpatialRelationInfoPos-r16 ::-        SEQUENCE {
    referenceSpatialRelationSelection-r17 ::-      SEQUENCE {
        srs- referenceSpatialRelation -17              SRS- referenceSpatialRelation -16
        }
}
```

Recalling the SOA procedure in FIG. 1. The procedure is shown in the examples of FIG. 3 and FIG. 4. The NW configures two kind of SRS resources:

the first (Config1) an SRS resource-set directed to toward the n-gNB. For this resource-set the UE performs beam sweeping (in the example 3 beams are generated sequentially (which can also be performed in parallel (simultaneous transmission) depending on the UE capability and NW configuration). These beams shall mainly target neighboring gNBs. For these neighboring gNB the UE either don't receive a DL-RS spatial relationship configuration, or the UE is not able to receive it, or the UE is not enforced to use it or (in case of other UL-RS are used as reference) there is no other transmissions towards this gNB.

the second SRS resource (Config2) targets the s-gNB. For this gNB a spatial relationship may be established. For simplicity, FIG. 4 shows the procedure with one neighboring gNB. The NW (ex. s-gNB) provides the UE with an RRC configuration with 2 SRS-ResourceSets:

The first resource set, includes 3× Periodic (or semi-persistent) resources

A common parameters that informs the UE to avoid using the Tx beam identified by the ssb-IndexServing-r16

The second resource set includes 1× aperiodic (could be configured as periodic or semi-persistent) resource:

A parameter that informs the UE to use the Tx beam identified by the ssb-IndexServing-r16 (same as Rel-16 configuration as in TS 38.331).

Figure 13:
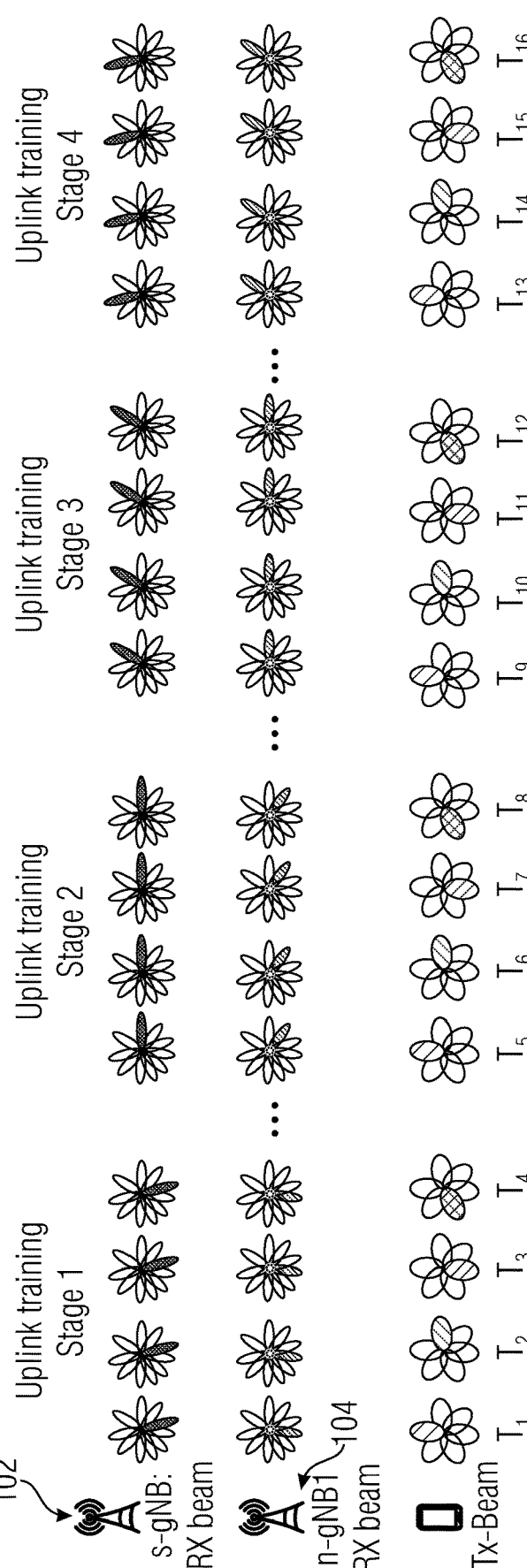
FIG. 13 a schematic representation of a known beam sweeping process.

NOTE: for simplicity the example in FIG. 13 and FIG. 3 show only the s-gNB (s-TRP) as a reference. The same principle applies when more than one reference is available. In fact, the more references are provided as SRS-Config to the UE the less the NW complexity may be and a better UE efficiency by reducing the number of undesired transmissions may be obtained.

Examples for related applications are:

For the resource set related to the s-gNB other parameters (update rate, etc.) may be used Resource set for s-gNB may be also used for RTT or AoA (@ TRP) measurements. In case of LOS reception a high accuracy may be already achieved by this method and the complementary SRS transmissions are mainly for complementary position measurements (for FIG. 5 shows a schematic flowchart of a method 500 according to an embodiment. Method 500 may be used to configure and/or operate a device within a network such as UE 10. At 510 the UE is configured with at least one SRS resource set and/or at least one resource. At least one of the sets of resources and/or the resources comprises a number of larger than 1.

At 510 it is determined if a spatial relation information is available, i.e., is the spatial relation not configured for a resource. If the spatial relation is not configured for a resource, path 522, the UE performs beam sweeping, details thereon may be a choice of UE implementation, i.e., implementation specific. This may be referred to as a UE expected behavior for non-configured spatial relation. However, if the spatial relation information for a resource is available or configured, path 524 may lead to a step 540 in which it may be determined whether the device is adapted to avoid spatial relations, i.e., avoid transmission towards a direction for which spatial relation is available. If such a configuration is not implemented or selected or activated, path 542 leads to a step 550 in which the TX beam, e.g., the UL-RS, is transmitted based on a use of a spatial relation available. This is a behavior of the UE as defined in release 16 of the UE.

Alternatively, if the device is implemented to avoid the spatial relations in 540, path 544 leads to a step 560 in which the UE avoids the spatial filter provided in the SRS resource configuration, i.e., prior to 520. This may allow that the UE avoids spatial relations for the configured SRS resources if configured.

In other words, FIG. 5 shows an overview of UE behavior to avoid spatial relation procedure.

Devices in accordance with embodiments provide for a UE being configured for transmitting at least one UL-RS, e.g., UL-RS 32 and/or 18, along a direction along which the UE has no spatial relationship information and for avoiding transmission of a UL-RS along which the UE has stored a spatial relationship information.

A UE in accordance with embodiments has information indicating a spatial relation between a reference RS and the target UL-RS. The UE is configured with respect to a spatial relation information for the UL-RS in a first state and for using the reference spatial relation to derive a spatial filter, e.g., spatial setting, for the UL-RS in the first state. The configuration signal 14 may comprise information indicating the reference RS.

A UE in accordance with embodiments may be configured for determining a spatial RX filter obtained from a SS/PBCH (SS=synchronization signal; PBCH=physical broadcast channel) block of a cell of the wireless communication network that serves the UE and for using the spatial RX filter as the reference spatial relation.

A UE in accordance with embodiments may be related to at least one of a sounding RS, e.g., configured by a higher layer parameter SRS-config or SRS-for-positioning, to a channel state information (CSI)-RS, a SS/PBCH block, a DL PRS (positioning reference signal) configured on a serving cell or a SS/PBCH block or a DL positioning RS configured on a cell not serving the UE or a combination thereof.

1.1.2 the NW Provides the UE with Higher Layer Parameters on a "Coarse" Directional Information and Resource Configuration to Use for UL Transmission 1.1.2.1 Baseline Idea In the previous section, it is left open for the UE implementation to decide the direction of the UL-RSs given the constraints provided by the SpatialRelation and AvoidSpatialRelation information. In this section, we extend the solution for the NW to provide additional configuration and direction information for the UL-RSs.

For simplicity we start with the concept for a scenario where a direct LOS path is available. Later we extend the concept to more complex scenarios with NLOS links between multiple TRPs and a UE as in an industry hall or an urban scenario.

Figure 6A:
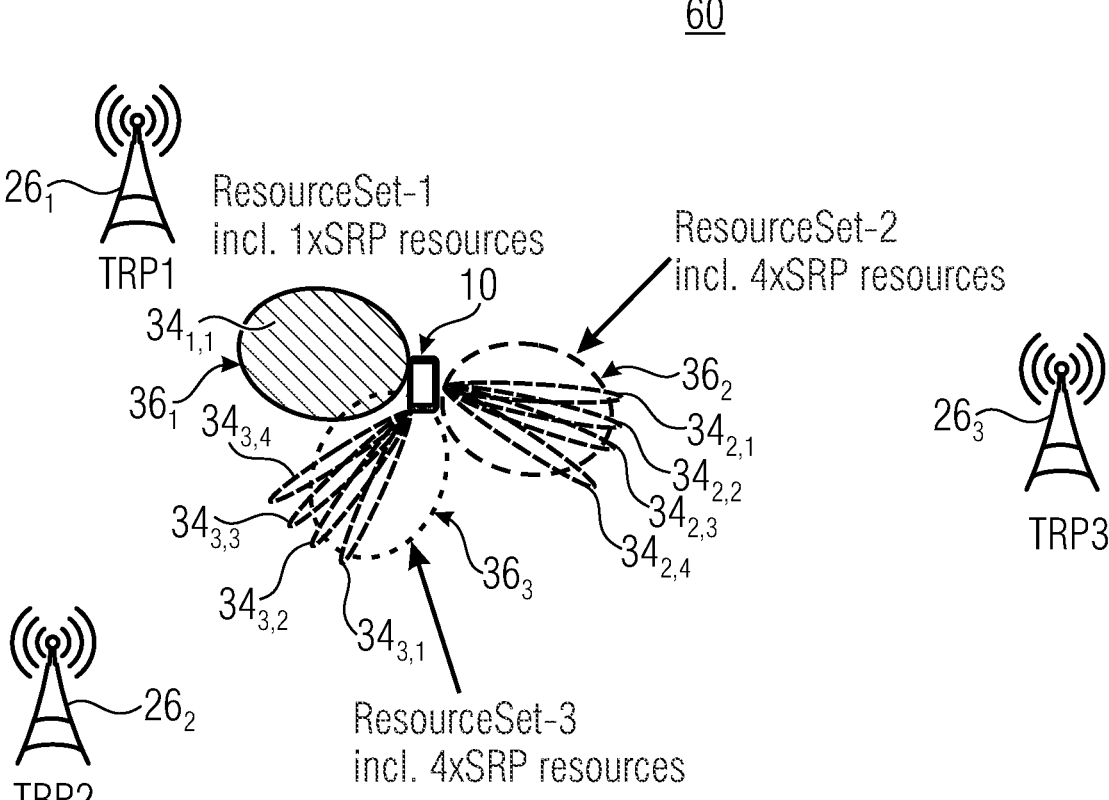
FIG. 6a shows a schematic block diagram of a wireless communication network for a three TRP deployment according to an embodiment.

Additional Direction Information:

FIG. 6a shows a schematic block diagram of a wireless communication network 60 for a 3 TRP deployment, i.e., a use of 3 TRPs. For TRP1, the spatial relation information for one UL-RS is configured (due to a DL RS or known UL RS transmission): Based on this at least ONE reference spatial information can be configured for other "target" UL-RS transmission. The NW may also have information on the TRP positions and can hence can make use of this knowledge to provide the UE with a direction information for the UL-RS(s) of ResourceSet 2 and 3. From the UE side, this can be visualized as in FIG. 6b; the beam #1, 44$_1$ indicates the reference spatial beam and is used as the beam to indicate the direction of the beam #2, 44$_2$. The direction of the targeted beam relative to the reference beam can be provided as a relative angle for azimuth [−180°, 180° ] and elevation [−90°, 90° ] where the 0° reference is the main lobe of the reference beam, OR the information can be provided as cardinal directions as [N, NNE, NE, ENE, E, ESE, SE, SSE, S, SSW, SW, WSW, W, WNW, NW, NNW] for an Azimuth or/and Elevation direction; where N, S, E and W stands for North, South, Earth and West. The additional information may provide beam characteristics (e.g., beam width, boresight gain, side lobe level, the radiation intensity of the half-power Beam width or the first null beam width)

Figure 6B:
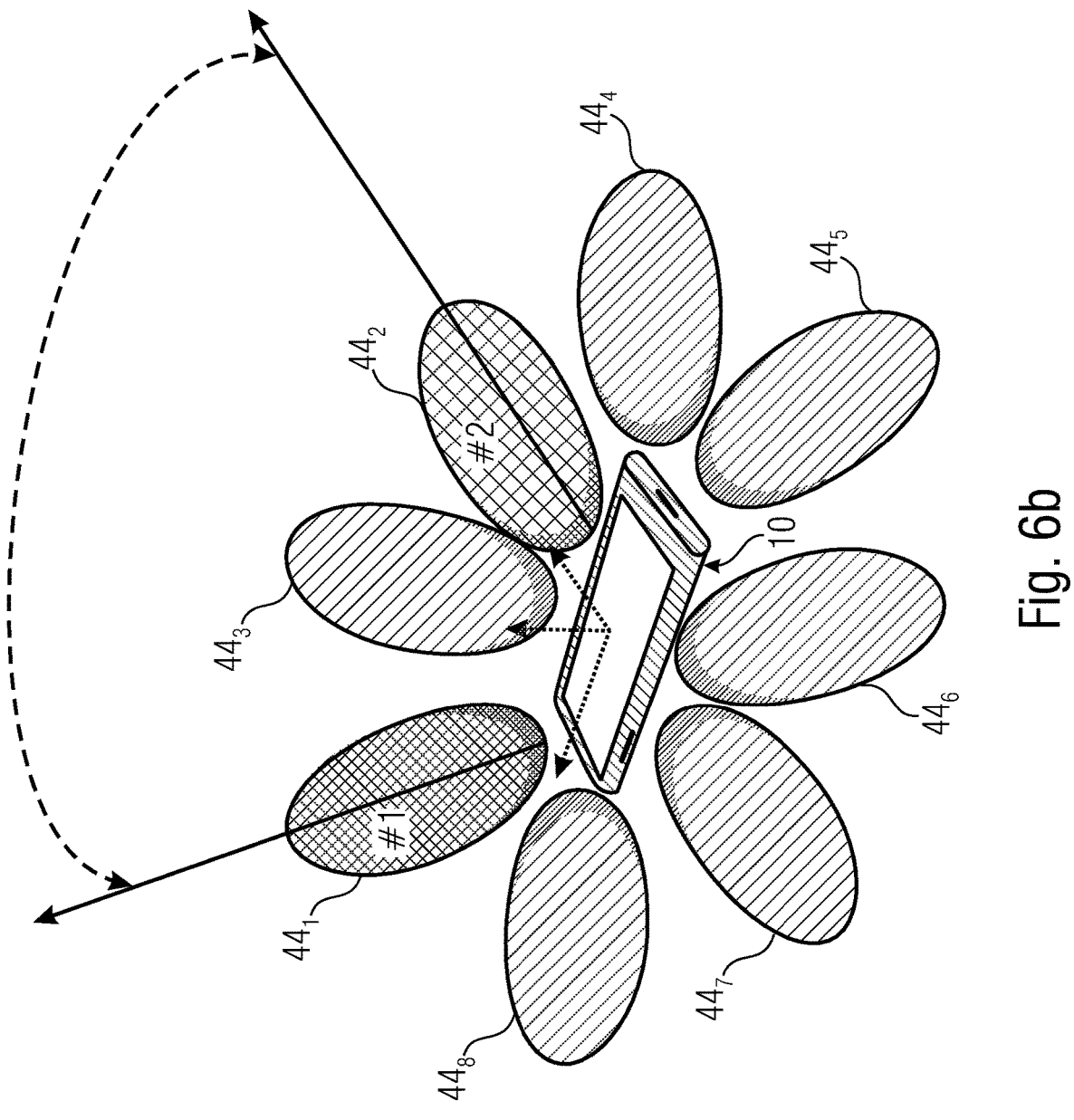
FIG. 6b shows a schematic perspective view of a UE and a plurality of UE TX beams according to an embodiment.

In other words, FIG. 6a shows a scenario in which the network configures the UE with resource sets 36$_2$ and 36$_3$ with directional information for TRP 26$_2$ and 26$_3$. In FIG. 6b a plurality of UE TX beams 44 is shown. Beam 44$_1$ provides for a reference spatial relation and beam 44$_2$ is the derived beam direction relative to the reference.

In FIG. 6a, resources 34 of a resource set 36 are indicated by an index 34$_{i,j}$, wherein index I relates to the resource set 36$_1$ belongs to and index j relates to an index within the resource set. For example, resource set 36$_1$ comprises a single resource 34$_{1,1}$ only, whilst other resource sets 36$_2$ and 36$_3$ may comprise two or more resources each.

UEs in accordance with embodiments may be configured for determining a direction of the UL-RS being transmitted using the resources 34, i.e., UL-RS 18 and/or 32, based on constraints indicated in the configuration signal 14. For example, the configuration signal 14 may indicate a target direction and/or a direction to be avoided. The UE may consider such information and operate accordingly.

The UE may be configured for evaluating the directions of the UL-RS resources indicated in the reference spatial relation relative to a spatial relation information derived by the UE as described in connection with FIG. 6a and FIG. 6b.

UE 10 has been described, so far, as being implemented to transmit the UL-RS 18 and/or UL-RS 32.

However, instead of transmitting the UL-RS 18 and/or 32 itself, the UE may be configured for receiving a signal indicating an UL-RS from another UE and for transmitting the UL-RS on behalf of the UE. The received signal may be received directly, may be received via at least one additional hop, e.g., a base station or another UE and/or via a sidelink. For example, the UE may be configured for receiving the signal indicating the UL-RS in a sidelink and for transmitting the UL-RS in the wireless communication network. That is, UE 10 may not only be configured for requesting another UE for transmitting the UL-RS on its behalf that may also transmit such a signal on behalf of another UE. This may be implemented independently from being configured with a reference spatial relation. That is, according to an embodiment, a user equipment is configured for operating in a wireless communication network that supports a plurality of reference signals (RS) such as sounding reference signals. The UE comprises a wireless interface configured for transceiving signals. The UE is a second UE and is configured for receiving a signal indicating an UL-RS from a first, different UE and for transmitting the UL-RS indicated in the signal on behalf of the first UE.

Embodiments described herein have been described so as to provide for the possibility to avoid transmission of some UL-RS.

However, when referring, for example, to the wireless communication network 60 being illustrated in FIG. 6a. The inventors have further found that a drawback of known systems is that a common power setting for different resource sets leads to insufficient results, in particular, as a pathloss between the UE 10 and different TRPs 26$_1$, 26$_2$ and 26$_3$ may be different.

Embodiments provide for a solution of this drawback by implementing a power control for transmitted UL-RSs to be individual for different resource sets and, possibly, for different resources within one set.

That is, for example, UE 10 may be adapted to use a first plurality of resource sets, e.g., resource sets 36$_1$, 36$_2$ and 36$_3$, wherein any other number of at least two is a valid embodiment. The UE may be configured for transmitting a plurality of UL-RS, each resource set having at least one resource for transmitting an UL-RS of the plurality of UL-RS. That is, when referring again to FIG. 6a and FIG. 6, for example, nine UL-RS may be transmitted by use of the nine different resources contained in the three different sets. The UE may be configured for performing a power control of a transmission power for transmitting the UL-RSs individual for a first resource set of the plurality of resource sets and for a second resource set of the plurality of resource sets. For performing the power control, to determine a transmission power to be used for the resource set, the UE may be adapted to determine the transmission power to be used for the resource set based on at least one of an information indicating a position of the UE and based on a position;

information indicating a position of a dedicated receiver of the UL-RS; and information indicating a channel condition between the UE and the dedicated receiver.

The channel condition may, for example, indicate a pathloss, a category, e.g., a line-of-sight path, a non-line-of-sight path or the like. For example, each resource set $36_1$, $36_2$ and $36_3$ may be configured or adapted so as to aim a reception of a specific TRP, e.g., resource set $36_1$ may be associated with TRP $26_k$, resource set $36_2$ may be associated with TRP $26_3$ and resource set $36_3$ may be associated with TRP $26_2$. Therefore, UL-RS being transmitting within a set may face varying channel conditions but may be at least comparable in view of a distance or a cause channel between the UE 10 and the TRP such that a power control individual for the resource set may be a solution for avoiding a receive power being too low for successful decoding at the receiver or a reception power being too high and therefore leading to oversaturation.

A UE in accordance with embodiments may be configured for transmitting the UL-RS towards a dedicated TRP and for performing the power control for the resource set comprising a resource used for transmitting the UL-RS to the dedicated reception point, e.g., a transmission reception point, wherein transmission is optional, using a pathloss reference with respect to a reference RP.

For example, the UL-RS for SRS may be defined per set. This may be done in accordance with:

The UL-RS power may be determined according to [3GPP TS38.213, v16.1.1]

$$P_{SRS,b,f,c}(i, q_s) = \min$$

$$\left\{ \begin{array}{c} P_{CMAX,f,c}(i), \\ P_{O\_SRS,b,f,c}(q_s) + 10\log_{10}(2^{\mu} \cdot M_{SRS,b,f,c}(i)) + \alpha_{SRS,b,f,c}(q_s) \cdot PL_{b,f,c}(q_d) \end{array} \right\}$$

$P_{O,SRS,b,f,c}(q_s)$ and $\alpha_{O,SRS,b,f,c}(q_s)$ are provided by the configuration signal 14 for active UL BWP b of carrier f of serving cell c, and SRS resource set $q_s$ is indicated by SRS-ResourceSetId from SRS-ResourceSet, and $PL_{b,f,c}(q_d)$ is determined based on the downlink pathloss estimate calculated at the UE based on a DL-RS of a serving or non-serving cell.

From the above, $PL_{b,f,c}(q_d)$ may be one, e.g., the only parameter changing (based on DL measurements); all other parameters may either be configured by the Network or extracted by the UE.

For this application, the UE is not necessarily configured to measure a DL-RS for each UL-RS resource set and hence the UE can NOT directly determine $PL_{b,f,c}(q_d)$.

The Pathloss depends on:

channel model: the channel characteristics depending on the scenario such as urban, rural, indoor or industrial environment; which derives the channel models as in [3GPP TR38.901 v16.1.1]

the distance between the UE and the TRPs the LOS or non LOS condition between the UE and the TRP antenna conditions (example hand blockage for some antenna panels at the UE side)

The entity that knows these parameters can determine the power control settings. The entity can be the Network or the UE. If the entity is a UE, it is expected that network provides assistance information that can include for example the TRP positions or information on the environment.

Additionally the power can determined based on one of the information above AND/OR a reference DL-RS (for example to the serving cell) when the UE is adapted to use a first plurality of resource sets for transmitting a second plurality of UL-RS, each resource set having at least one resource for transmitting an UL-RS of the plurality of UL-RS, wherein the UE is configured for performing a power control of a transmission power for transmitting the UL-RSs individually for a first resource set of the plurality of resource sets and a second resource set of the plurality of resource sets.

Figure 7:
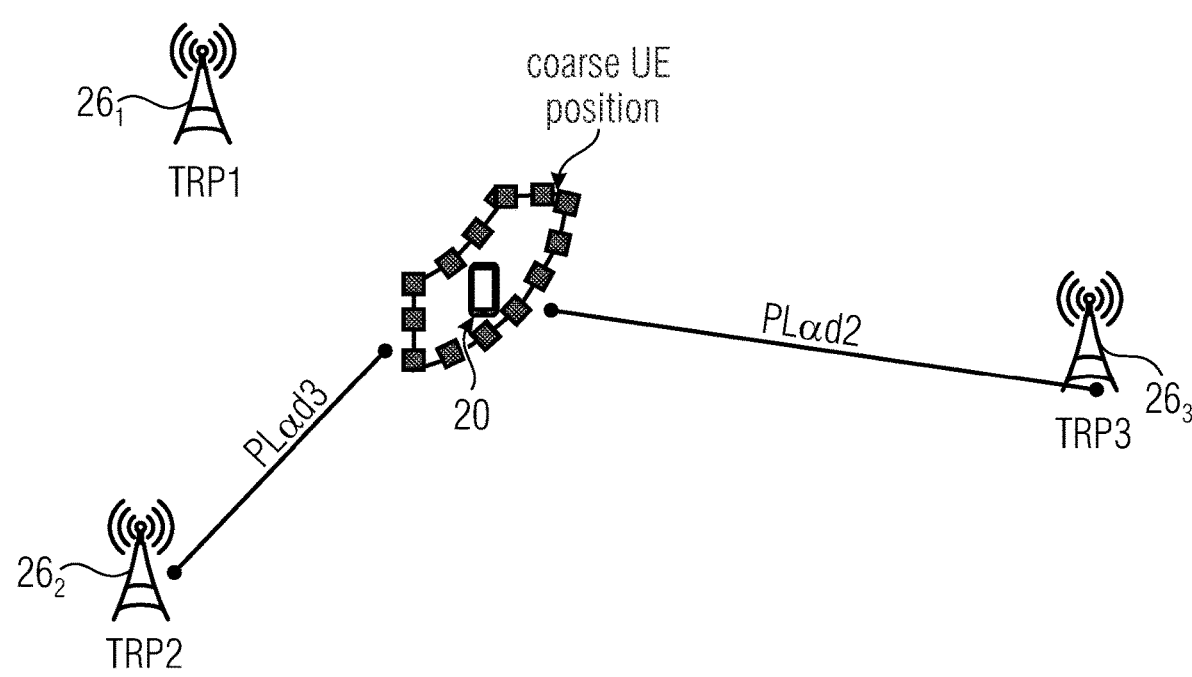
FIG. 7 shows a schematic block diagram of a wireless communication network according to an embodiment implementing an aspect of performing a set-individual power control for UL-RS.

FIG. 7 shows a schematic block diagram of a wireless communication network 70 according to an embodiment. The aspect of performing a set-individual power control for UL-RS may be implemented in addition or as an alternative to configuring the UE with a reference spatial relationship.

UE 20 is configured for operating in a wireless communication network, e.g., network 70, that supports a plurality of reference signals (RS) such as sounding reference signals. UE 20 may also be operated in wireless communication network 30 and/or 60. UE 20 comprises a wireless interface, e.g., wireless interface 12. UE 20 is capable of beam forming with the wireless interface so as to form different beams, e.g., using different resource sets and/or resources. UE 20 is adapted to use a first plurality of resource sets for transmitting a second plurality of UL-RS. Each resource set, e.g., resource sets $36_1$, $36_2$ and $36_3$ comprise at least one resource 34 for transmitting an UL-RS, e.g., UL-RS 18 and/or 32. The UE is configured for performing a power control of a transmission power for transmitting the UL-RSs individually for a first resource set and for a second, different resource set. For example, resources of a resource set that points towards TRP $26_3$ may comprise a different pathloss (PL), a different value $\alpha$ and/or a different distance d2 when compared to a coarse path between UE 20 and TRP $26_2$ having a distance d3, such that PL$\alpha$d2 is different when compared to PL$\alpha$d3. This different pathloss may be considered such that a higher pathloss may be associated with a higher transmission power, for example, to allow for a balancing of the different pathlosses between the different sets. A position of the UE may be a parameter that influences the selected power. The more precise the position may be determined, the more precise a power control may be performed. However, a coarse position 44 of the UE may also lead to sufficient results and may allow to avoid network load for performing a detailed positioning. As discussed, the functionality of performing set-individual power control may be combined without any limitation with the functionality of the configuration signal 14 being evaluated by the UE such that UE 20 may also comprise a controller 16 configured for evaluating a configuration information in the configuration signal 14 to determine the reference spatial relation. UE 20 may be configured for using the reference spatial relation as a reference for an UL-RS in the wireless communication network. In other words, in addition or as an alternative to the direction information, the NW has the ability to assign dedicated Power Control configuration for each resource set. Note due to the unknown beam direction the target UL-RSs is in the current 3GPP Rel-16 configured with one power control setting over the whole Tx sweeped beams within one SRS resource set. The drawback is in this case that the power setting is often a tradeoff between sending with high power to reach the TRPs in worst conditions and UE/NW efficiency (UE power consumption and interference at neighboring cells for the NW).

In the scenario of FIG. 7 showing a power control determined based on network information, e.g., channel condition and beam direction, FIG. 7 may also be interpreted for the same scenario how the power control (PC) is determined. According to an embodiment, the following may be implemented:

1. The NW determines a coarse UE position (for example from eCID)
2. The NW has the knowledge of the TRP positions and the channel scenario (Urban, Rural, Industry Hall . . . )

The NW can predict the power setting from the reference spatial relation link and based on the distance range and uncertainty and/or the environment. The pathloss in FIG. 7 is based on the distance (d3 and d2) coarse UE position and the TRPs 2 and 3.
3. The NW can assign an UL beam direction for multiple UL resource sets or resources
4. Based on the information above the NW can define the power control parameters per resource set. The UE is configured per resource set with the power control in a given direction In Rel-16 it is possible to configure the resource sets with different power setting BUT it's up to the UE to decide which spatial filter to use, if not configured The UE can determine the transmit power if the information in 1 and 2 are provided by the network According to embodiments, a power control using the pathloss information of a reference resource ID with the reference spatial relation may be used.

Figure 8:
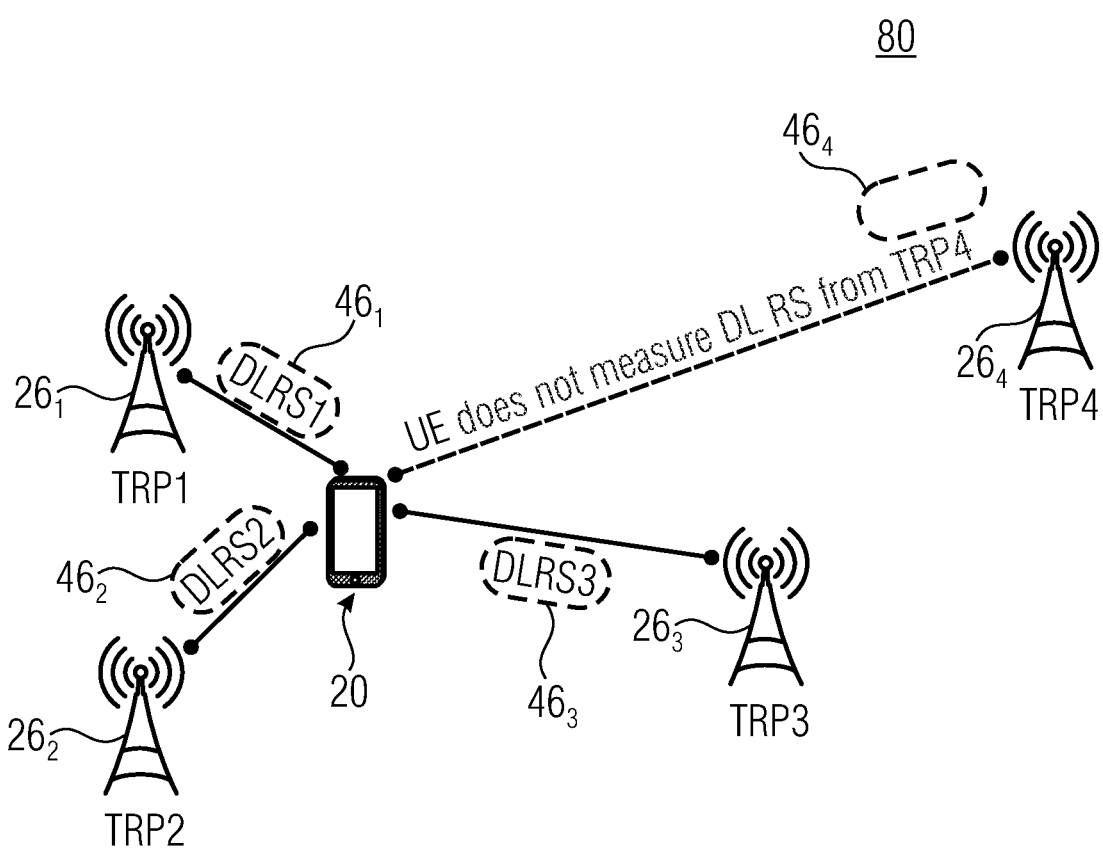
FIG. 8 shows a schematic block diagram of a wireless communication network in accordance with an embodiment in which the UE has different distances and/or pathlosses to different TRPs.

FIG. 8 shows a schematic block diagram of a wireless communication network 80 in accordance with an embodiment.

When compared to the wireless communication network 70, at least a fourth TRP 26$_4$ is present in wireless communication network 80. From TRP 26$_1$, UE 20 may measure one or more reference signals contained in a downlink resource set 46$_1$. From TRP 26$_2$, UE 20 may measure a DLRS 46$_2$ and from TRP 26$_3$ a DLRS 46$_3$. However, based on a pathloss being too high, a different kind of blockage or the like, the UE is unable to measure a DLRS 46$_4$ transmitted by TRP 26$_4$. In the wireless communication network 80, a pathloss reference estimate of a TRP, e.g., TRP 26$_4$ may be based on a pathloss estimate from a reference resource ID. Alternatively, the UE can be configured to perform power control to a second TRP using a pathloss reference with respect to a reference TRP. The UE may possibly not be able to measure a DL RS from a second TRP (for example TRP4) or it may not be able to maintain independent pathloss (subject to UE capability).

The pathloss measurement made with the reference TRP could be linearly adjusted with a scaling and an offset parameter to obtain an estimate of pathloss to the second TRP. The advantage of this approach is that the number of independent pathloss estimates the UE is required to maintain is smaller. To this end, the UE needs to use at least one of the following new two higher layer parameters to configure with target UL-RS resource or resource set:

1) Scaling parameter (gamma/γ)
2) Offset parameter (Delta_pl/ΔPL)
PI_TRP2_OL=gamma*PL_TRP_ref+Delta_pl_TRP2

The pathloss estimate PL_TRP2_OL could then be used to determine the pathloss to a TRP, where the UE either cannot measure the downlink reference signal or is not maintaining the pathloss measurement.

The adjustment parameters for open loop (scaling and offset) can be determined by the UE based on the assistance data provided by the network, which may include 1) Applicable channel models
2) Deployment scenario
3) Location of network elements including but not limited to TRPs The network may derive the configuration of the pathloss scaling either 1. Implicitly based on the knowledge the network has about the location of the network elements, such as TRPs coarse UE location, for example, based on TA, E-CID, AoA knowledge of physical environment, for example, a map, known stationary objects in the environment use of channel models
2. Explicitly based on measurements on the uplink reference signals For example, the UE may be configured for using a scaling parameter to scale the transmission power between different resource sets and/or an offset parameter to offset the transmission power between different resource sets.

One way the scaling information can be provided is by specifying a relative power control within the SRS resource by adding an information element, IE, RelativePathlossAdjustment

---

```
RelativePathlossAdjustment :- SEQUENCE {
   gamma                    Gamma   OPTIONAL, -- NEED R
   plOffset                         INTEGER (-MINVAL, MAXVAL)
OPTIONAL -- NEED R
};
```

---

Where the Gamma is a scaling factor and plOffset is an offset to be added to the pathloss estimate obtained using pathloss reference RS specified as a part of the SRS resource set. Note that the gamma could be specified either to overwrite the alpha parameter specified in the SRS resource set or it could be provided as a scaling factor to the alpha parameter.

If the gamma is not specified, then the pathloss control equation uses the alpha specified as a part of SRS resource set. Likewise, if the plOffset is also not specified, then the power control would result in the default behaviour of Rel. 16 mechanism, which is power control with respect to the existing TRP.

Furthermore, the UE could also use its knowledge of its antenna radiation pattern or beam patterns to derive a further adjustment to gamma (γ) and pOffset or APL.

If the UE receives a configuration containing the pathloss scaling parameters, then it uses the parameters from this configuration to derive the pathloss between the UE and the second TRP based on the downlink pathloss reference RS from the reference TRP.

After transmission, the network measures a certain power at the second TRP. It could then compute the difference between the signal received on the reference TRP and on the second TRP. If the network has received x dB on the second TRP while the reference TRP received y dB, then the network could signal (x–y) dB as the relative difference.

The network could use this relative difference to reconfigure the scaling parameters for RelativePathlossAdjustment, or send closed loop power control commands.

$$PL_{TRP2\_OL} = \gamma * PL_{TRP_{ref}} + \Delta PL_{TRP2}$$

where $PL_{TRP2\_OL}$ is the estimated pathloss to the dedicated RP associated with a second resource set; $\gamma$ is the scaling parameter, $PL_{TRP\_ref}$ is the pathloss to the reference RP and $\Delta PL_{TRP2}$ is the offset parameter.

The closed loop power control commands may be sent using MAC CE or using DCI.

The adjusted parameters for RelativePathlossAdjustment may be communicated to the UE either using RRC reconfiguration, MAC CE updates or using the DCI signaling.

The following flow summarize the procedures in this section:

Capability

The NW requests the UE capabilities (provided in 1.11.1)
  Use UE additional sensors like gyroscope and Barometer to determine the beam direction and Elevation in combination with at least one spatial reference beam Beams Directions At the NW, identify a first UE position (based on a coarse estimate from eCID, AoD or other information) TRP positions
  the NW derives the UL-RS configuration directions
OR
The UE derives the beam direction to reach the desired TRPs based on Additional information provided by the NW (example the TRP position).

Higher Layer Configuration:

The UE is provided by the NW via higher layer signaling with a configuration comprising one more resources sets including one or more resources for UL-RS transmission(s):
  The configuration includes information for at least ONE UL-RS in relation with the reference spatial relation; where the information includes:
    Detailed description in previous section: The direction of the targeted beam relative to the reference beam
      The information can be provided as an Azimuth [−180°, 180°] and Elevation Angle [−90°, 90°] where the 0° reference is the main lobe of the reference beam
      The information can be provided as cardinal directions as: [N, NNE, NE, ENE, E, ESE, SE, SSE, S, SSW, SW, WSW, W, WNW, NW, NNW] for a an Azimuth or/and Elevation direction; where N, S, E and W may represent North, South, East and West.
      The information may include beam characteristics (e.g., beam width, boresight gain, side lobe level, the radiation intensity of the half-power beam width or the first null beam width)
      The information may include the direction of the horizontal or/and vertical displacement measured clockwise from a reference with steps of X degree where X can range from [0.1°, to 90°].
    The power control as described above FIG. 9 shows a schematic perspective view of a wireless communication network 90, at least a part thereof together with distances along two orthogonal directions x and y in meters. A number, position and size of objects, elements and/or other instances in the wireless communication network 90 is chosen by way of non-limiting example only. The wireless communication network 90 may comprise a plurality of TRPs $26_1$-$26_3$, one or more scattering structures $52_1$ and/or $52_2$ and/or one or more blocking objects $45_1$ and/or $45_2$, e.g., buildings or the like. A UE 30 which may be in accordance, for example, with the explanations given in connection with UE 10 and/or UE 20, may move between different positions along a path 56 such that different channel conditions towards different TRPs may vary. For example, at a position $P_1$, e.g., located at (12, −1) non-line-of-sight (nLoS) paths $58_1$ and $58_2$ may be available towards TRPs $26_1$, $26_2$ respectively. Towards those TRPs line-of-sight (LoS) paths $62_1$ and $62_2$ may be blocked by blocking objects $54_1$, $54_2$ respectively. For example, a LoS path $62_3$ may be available towards TRP $26_3$.

At position $P_2$, e.g., at (17, 0) in the x/y coordinates, a situation may have changed such that updating the information at the UE 30 in view of the reference spatial relationship and/or power control may be of advantage.

According to an embodiment, a UE is configured for using the scaling parameter and the offset parameter based on the determination rule:

$$PL_{TRP2\_OL} = \gamma * PL_{TRP_{ref}} + \Delta PL_{TRP2}$$

wherein $PL_{TRP2\_OL}$ is the estimated pathloss to the dedicated RP associated with a second resource set; $\gamma$ is the scaling parameter, $PL_{TRP\_ref}$ is the pathloss to the reference RP and $\Delta PL_{TRP2}$ is the offset parameter.

The UE may be configured for using the estimated pathloss in a case where the UE cannot measure a downlink reference signal from the dedicated RP or is not maintaining the pathloss measurement.

The UE may be configured for determining the scaling parameter and/or the offset parameter in an open-loop determination.

The UE may be configured for determining the scaling parameter and/or the offset parameter in a closed-loop determination using a feedback from the UE, e.g., a Medium Access Control (MAC) Control Element (CE) and/or a Downlink Control Information (DCI).

The UE may be configured for determining the scaling parameter and/or the offset parameter based on at least one of
  an applicable channel model;
  information on the distance separating the UE and network elements, comprising RPs.

The UE may be configured for receiving a signal from the wireless communication network indicating the scaling parameter and/or the offset parameter.

The UE may be configured for using a reference value for a pathloss and/or a scaling factor to be used for the power control when being not provided with the scaling factor or the offset parameter.

1.1.2.2 Extension to Complex Scenarios

Figure 9:
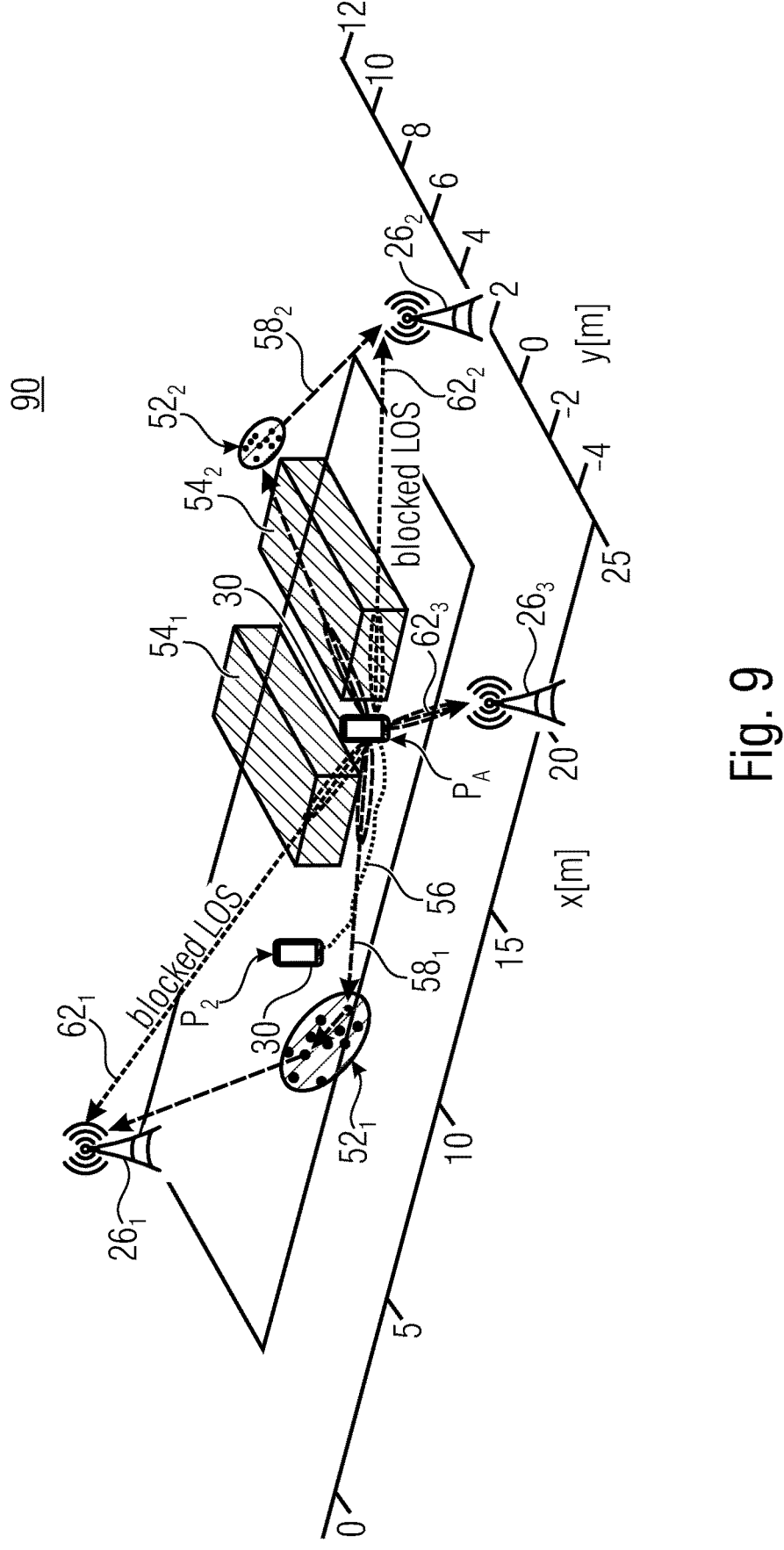
FIG. 9 shows a schematic perspective view of a wireless communication network according to an embodiment, at least a part thereof together with distances along two orthogonal directions x and y in meters.

In this scenario of FIG. 9, we extend the solution beyond the LOS assumption of the previous section. The NW does not only rely on an initial UE or TRP position, but also knows additional map details where the diffraction, reflection and blockage can be derived. This can be derived by the NW for example by Raytracing tools or simplified approaches from a map (these tools are considered state of the art and are not part of this invention).

Looking at FIG. 9, a UE is moving from a position (x,y)=(17,0) to position at (12, −1). The channel condition with respect to the nearest TRP is not changing and a LOS link is valid over the track. For the far-away TRPs the channel conditions change and the LOS is often blocked, but sometimes also present.

1.1.2.2.1 Blocked LOS UL-Resource Configuration

For UL based multi-TRP applications the reflected part adds an error on the estimated ToA-Time of arrival according to the additional time-of-flight of. For this scenario the NW can make use of this application in 2 things:

First, the NW can configure an UL-RS (with lower periodicity) towards the LOS path of the TRP despite knowing the path is blocked (RED beams). While the UE is moving this link may be detected by the TRP and hence a better ToA estimate can be derived.

Second, the NW might use the MAP knowledge to configure a Beam toward a scatter which position is known by the NW.

The power control and direction detection from the previous scenario applies here for both cases.

1.1.2.2.2 NLOS Determination

Determine if a TRP-UE link is LOS/NLOS condition for on an UL-resource configured with relation of the reference spatial direction. Additional MAP or coarse position information can be used to determine the NLOS condition.

Example

Step 1: The NW can detect if a Link corresponding to a DL or UL or sidelink Reference signal is a LOS link or not. This can be achieved if a UE is in region w.r.t to ONE TRP where the LOS probability is high (due to environment, UE or TRP height or UE-TRP distance). (The link can also correspond to NLOS reception from a known departure or arrival angle)

Step 2: A reference spatial relation is configured for one or more resources, where the reference spatial relation is based on the information of step 1

Step 3a: the UE is configured to transmit one or more UL resources as configured by a reference spatial relation IE; Or/and Step 3b: the UE is configured to measure one or more DL resources related to a reference spatial relation IE Step 4: Classify the LOS/NLOS links based on the measurements of the assigned links in step 3 and the NW information (steps 1 and 2)

According to an embodiment, the UE may be configured for receiving instructions from the wireless network, e.g., from a controller entity or network controller, to activate, update or deactivate a use of the reference spatial relation. The UE, e.g., UE 10, 20 and/or 30 may be configured for operating according to the instructions. The UE may be configured for receiving the instructions as predictive instructions related to a future instance of time and for implementing the instructions at the future time. For example, a path of movement and/or other knowledge about a future position and/or configuration of the UE may be used to determine a future configuration of the UE and to instruct the UE accordingly.

The UE may be configured for receiving information indicating a directional relation of the UE and/or power control related to a future predicated window. The UE may be configured for determining a change of a UE position or orientation in the wireless communication network and to adapt a parameter, e.g., a spatial filter, a power setting or a combination thereof or other parameters, used for transmitting the UL-RS 18 or 32 based on the received information. For example, the UE may be configured for certain values of a power setting or a spatial filter and/or resources to be used for transmitting signals, e.g., for a case where a specific path towards a TRP is blocked. Such a blocking may occur, e.g., by a user holding a part of a body into the path, by arranging a blocking object in the path or any other event. For example, the UE may monitor that it has rotated and that has a different orientation in space and that possibly resources that now direct towards a floor or other structures is to be replaced by other configurations.

For example, the UE may be configured for updating the reference spatial relation. Such an update may be done, for example, when transmission is possible for the UE. For example, if the UE is configured to send in a certain direction and the UE cannot do that, either because of a blockage or a collision with other UL-RS with higher priority or the like, then the UE can be configured either to transmit the UL-RS in the default configuration or not to transmit these resources, at least with this configuration, at this time. Assuming the UE is configured to transmit the UL-RS on multiple time instance, e.g., $t_1, t_2, \ldots, t_N$ and at one time instance, e.g., $t_1$ the UE cannot send the UL-RS in the configured direction, it may send in the direction where the MIBs are decoded (as default) as an example. The question is in which direction should the UE transmit if the situation changes at $t_2$. Embodiments propose that the UE automatically updates its spatial relation according to the desired configuration, if possible. This adaption can be independent of the reference relation. That is, the UE may be configured for transmitting UL-RSs on at least a first time instance and a later second time instance and for using, at the first time instance the UL-RS along a default direction based on a channel condition of the UE, e.g., based on a hampered transmission. The UE is configured for updating the reference spatial relation for the second time instance based on a changed channel condition. The changed channel condition may be a transmission capability recovery, i.e., the possibility to transmit or transmit again. As discussed, this implementation may be independent from the other aspects described herein.

1.1.2.2.3 Update Spatial Information

The channel condition changes for a UE moving. The Reference Spatial Relation will change as well from one position to the next. To avoid the complexity and latency from permanently configuring a UE with changing characteristics, the NW can configure the UE to change, update or deactivate the reference spatial information based on a change with channel conditions. The condition can be based on an RSRP measurement, handover, a timed-out RS or other channel measurements.

The NW can provide a list of the directional relations and power control related to a next predicated windows IN ADVANCE so that a UE can automatically update the configuration without the need of the NW providing additional configuration sessions.

Especially if the UE include a sensor detecting the change of orientations (e.g. gyroscope) the UE can select a new spatial filter according to this information without receiving further information. This may be useful for rotating devices, for example.

1.1.3 UE Orientation Determination with the Reference Spatial Information

Use UE additional sensors like gyroscope (subject to UE capability) to determine the beam direction in combination with at least one spatial reference beam:

A UE with 3-axis accelerometer is able to detect its orientation. When also equipped with an additional 3-axis gyroscope, the UE has access to additional information dimensions made possible by tracking rotation and twist. The procedure may look something like:

The UE tries to obtain an orientation estimate, which can be related with respect to two frames of reference; the global frame of reference (related to NW), and local frame of reference (related to UE). For example, the obtained orientation estimate can be transformed in a manner that can be understood by both the NW and UE. Such a transformation may be related to the direction orthogonal to the surface of the earth, since it is easy for the accelerometer and gyroscope to sense the direction of gravity.

The UE elevation can be determined either by internal UE sensors like a barometer or using NW determination approached (Positioning or NW information). This information can provide the elevation information for beam pointing in the direction of spatial relation filter. The NW uses this information to indicate the Beam direction for the UE The UE uses this obtained orientation and optional elevation information in order to adjust its frame of reference to that of the global one, and then uses this adjusted frame of reference as its new zero point (i.e., UE with no orientation and/or tilt).

The UE can then sweep the beams or use an existing spatial filter transformed according to its new frame of reference for increased sweeping efficiency and/or interference mitigation.

The UE can indicate to the NW a new spatial filter or Tx beam has been chosen based on the changing channel characteristics due to movement, orientation change or a blockage for a UE antenna panel.

1.1.4 Additional Information Reported to NW for Determining the Directional Configuration NW needs the sensor information to configure the spatial a spatial relation.

The NW can request the Sensor information from the UE. The information includes: altitude, bearing (This field specifies the direction (heading)), bearingRef (This field specifies the reference direction for the bearing) and the time for the sensor measurements.

Based on this information, the NW can provide the moving UE with assistance data for SRS configuration. The assistance data is used by the UE makes use of this assistance to update its spatial relation. This information can include on or more of:

SpatialRelationInfoPos:

Reference Spatial relation

Directional information

Reference Position (optional)

Time Reference: $t_{ref}$ (optional)

Displacement relative to TimeRef: provides the validity of the SpatialRelationInfoPos field with respect to direction and distance travelled with respect to $t_{ref}$ (optional)

1.1.5 Dependencies

SRS Activation and Deactivation and Configuration Update

An SRS resource set can be configured as periodic, aperiodic (single transmission) and semi-persistent (periodic over a defined time interval).

The configuration of an SRS depends on the RRC ResourceType configured within a SET.

Spatial relation configuration update and trigger:

For a resource type periodic the SRS triggering or configuration update is performed by RRC; for Semi-Persistent SRS is triggered or updated by MAC-CE; for Aperiodic SRS is triggering is performed by DCI).

Example on Using Different Spatial Relation Configuration Related to the Idea:

An SRS resource set is configured by RRC as periodic with spatial relation to an SSB with the serving gNB Trigger and update is performed on RRC level An SRS resource set is configured by RRC as aperiodic with no spatial relation information on multiple Resources The transmission of the RRC configured resources is triggered by DCI and updated by a new RRC configuration An SRS resource set is configured by RRC as Semi-Persistent with no spatial relation information multiple Resources The serving gNB van update the MAC-CE spatial relation information (avoid-spatial relation)

Inter-Frequency Measurements:

The NW can indicate the reference spatial relation configuration for a UE on different frequency layers, frequency ranges or Bands. The reference spatial relation configuration can be common for multiple frequency layers.

Example 1

TRP1 support TRX in band 1 and band 2, UE supports TRX in both bands. The NW can indicate a UE with a reference spatial relation for band1 and configure the transmission for band2.

UE Cannot Transmit in the Configured Direction

The target UL-RSs can be configured in a given direction with respect to the reference spatial relation however the UE cannot transmit in the desired direction. This can be due to a blocked antenna panel or due to a second transmission with higher priority. Example of Hand blockage may lead that the UE should not send the beam in the desired NW direction.

The UE can be report to transmit on the default used to decode the MIB or to transmit on the spatial relation with the best characteristics in this direction.

The UE can be also configured to update it spatial relation (for periodic and semi-persistent configuration) for the resources when the transmission in the desired direction is possible.

Embodiments described herein relate to the behavior of a UE. The behavior of a UE may be controlled, triggered or at least be influenced at least partly by activities of the network. Further embodiments, therefore relate to a controller entity or network controller of a wireless communication network. The network controller may be arranged or in communication with a TRP and may thus influence also a behavior of a TRP. Via a TRP or an antenna panel or a base station, the network controller may communicate with one or more UEs, i.e., it may cause the network to transmit messages to the UE and/or may evaluate a message transmitted from the UE.

According to an embodiment, a controller entity id configured for controlling at least a part of an operation of a wireless communication network that supports a plurality of reference signals (RS) such as sounding reference signals, wherein the wireless communication network is adapted to communicate with a user equipment (UE), the controller entity being configured for:

determining a filter information indicating at least one spatial filter to be used by the UE to transmit an uplink-RS;

transmitting an indicator signal to the UE, the indicator signal comprising the filter information.

Embodiments provide for a controller entity being configured for generating the indicator signal so as to indicate instructions, to the UE, a reference spatial relationship providing information about Embodiments provide for a controller entity being configured for transmitting a signal to the UE, the signal comprising instructions indicating a number of UL resources without a spatial relation indication.

Embodiments provide for a controller entity being at least a part of a transmission/reception point (TRP) or a location management function (LMF)

Embodiments provide for a controller entity being configured for determining a scaling parameter and/or an offset parameter to adjust a pathloss determination of the UE based on at least one of a location of network elements, e.g., comprising RPs;

a coarse location of the UE;

a knowledge of a physical environment; and a use of channel models;

a measurement of an UL-RS received by the wireless communication network;

and for transmitting the scaling factor and/or the offset parameter to the UE.

Embodiments provide for a controller entity being configured for transmitting the scaling factor and/or the offset parameter to the UE within a signaling of a RS resource to be used for the UL-RS.

Embodiments provide for a controller entity being configured for transmitting a request signal to the UE indicating a request to receive capability information indicating a sensor capability of the UE; for receiving sensor information from the UE and based on the request signal, the sensor information comprising sensor data and for determining the reference spatial relation using the sensor data.

Embodiments provide for a controller entity being configured for receiving sensor information comprising sensor data, e.g., based on a prior request, and for providing the UE with assistance data related to the spatial relation, the assistance data comprising at least one of:

information indicating a SpatialRelationInfoPos, e.g., a reference Spatial relation and/or a directional information information indicating a reference position information indicating a time reference: $t_{ref}$ information indicating a displacement relative to a time reference Embodiments provide for a controller entity being configured for receiving capability information, e.g., based on a prior request, comprising at least one of a minimum number of UL TX beams for a full coverage (360°)

a number of beams which can be generated in parallel in digital and/or analog beam forming a number of TX beams within one beam (coarse beam)

Available EIRP versus beam width a capability to reduce beam width

Support of different beamwidth for positioning and communication information indicating a relative beamwidth a capability to identify a global direction based on one spatial relation information Roll and pitch angle defined by UE mounting or by a sensor In this case the yaw angle can be derived from the beam direction of the UE and the position of the TRP a capability to identify a global direction based on two or more spatial relation information For circular polarization or dual-polarization transmissions/reception it may be not required to distinguish all 3 UE orientation angles.

For linear polarization 3 (T)RP may be used a capability to identify a block beam direction (ex. hand blockage)

and for determining the reference spatial relation using the capability information.

Embodiments provide for a controller entity being configured for determining a property, e.g., a line-of-sight-category or non-line-of-sight-category of a beam to be used for the UL-RS and for updating the configuration information with a first repetition rate when having determined the property to be a first type, for updating the configuration information with a different, second repetition rate when having determined the property to be a second type.

Embodiments provide for a controller entity being configured for determining a change in a channel condition between the UE and other network entities of the wireless communication network and to activate, update or deactivate a use of the reference spatial relation based on the change.

Embodiments provide for a controller entity being configured for determining the instructions as predictive instructions related to a future instance of time based on an expected future condition of the wireless communication network.

Embodiments provide for a controller entity being configured for determining information indicating a directional relation of the UE within the network and/or power control related to a future predicated window and to provide the information to the UE.

In embodiments, a wireless communication network comprises at least one UE described herein and at least a controller entity described herein.

Capability:

The network can request one or more of the following new UE capabilities:

Minimum number of UL Tx beams for a full coverage (360°)

Number of beams which can be generated in parallel (digital or analog beam forming): Simultaneous transmission for 2 or more UL-RSs Number of Tx beams within one beam (coarse beam)

Available EIRP versus beam width (for a wider beam the supported EIRP may be lower)

Capability to reduced beam width (=generate narrow and wide beams)

Support of different beamwidth for positioning and communication

Relative beamwidth narrow/wide beam

Capability to identify a global direction based on one spatial relation information Roll and pitch angle defined by UE mounting or by sensor In this case the yaw angle can be derived from the beam direction of the UE and the position of the TRP Capability to identify a global direction based on two or more spatial relation information For circular polarization or dual-polarization transmissions/reception it may be not required to distinguish all 3 UE orientation angles.

For linear polarization 3 TRP may be required (or at least 1 TRP uses two polarizations)

Capability to identify a block beam direction (ex. hand blockage)

Interfaces:

Case 1: The s-gNB configures a UE:

The configuration is provided over the RRC interface when the NW entity is a serving-gNB or a serving TRP.

The LMF can provide the gNB with information over an NRPPa interface

The gNB can inform the LMF with UE-related RRC configuration

Case 2: LMF configures a UE

The configuration is provided over the LPP interface when the NW entity is an LMF. The LPP configuration is provided over the user-plane or control plane.

The LMF can provide the gNB with information over an NRPPa interface.

The gNB can inform the LMF with UE-related RRC configuration.

RRC SRS Resource and Resource Set

The configuration of the SRS is determined by the RRC resource set and resources, and characterized by an SRS Config: List of Resources (max 64 resources) and Resource Sets (max 16 resources) to be added or removed The maximum number of SRS resources per set for positioning is 16 (N).

Figure 10:
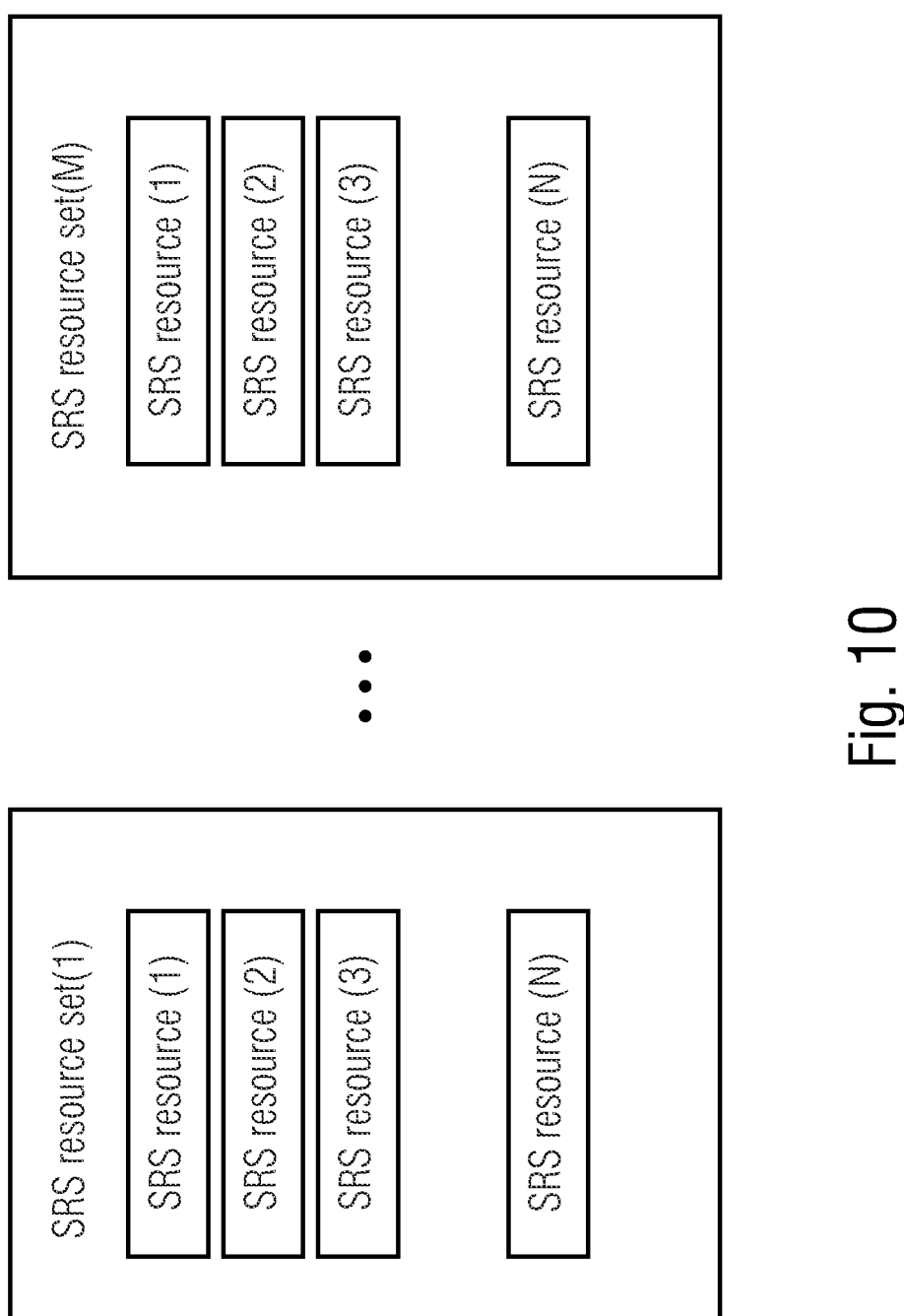
FIG. 10 showing a schematic representation of an SRS resource within a resource set according to an embodiment.

The maximum number of supported SRS resource sets for positioning is a UE capability, with configurability of up to 16 resource sets per BWP. Values for the UE capability include {1,16}→(M), see FIG. 10 showing a schematic representation of an SRS resource within a resource set.

A Positioning SRS-Resource-Set according to release 16 and as shown in FIG. 11 may define:

SRS resources list within the Set

Triggering Types for resources within a Set (Periodic, SP: Semi-Persistent, Aperiodic)

Power Control parameters

Alpha and P0 value

The reference signal used path loss determination

Positioning Resource Set RRC Messages:

for multi-TRP UL beam operation and allow to enable operation for received only notes especially, in FR2, e.g., notes that do not transmit DL-RS for which no beam correspondence may possibly be determined.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

```
SRS-PosResourceSet-r16                    SEQUENCE {
    srs-PosResourceSetId-r16                  SRS-PosResourceSetId-r16,
    srs-PosResourceIdList-r16                 SEQUENCE (SIZE(1..maxNrofSRS-ResourcesPerSet)) OF SRS-PosResourceId-
r16
OPTIONAL, -- Cond Setup
    resourceType-r16                          CHOICE {
    aperiodic-r16                                 SEQUENCE {
        aperiodicSRS-ResourceTriggerList-r16          SEQUENCE (SIZE(1..maxNrofSRS-TriggerStates-1))
                                                  OF INTEGER (1..maxNrofSRS-TriggerStates-1) OPTIONAL, -- Need M
        slotOffset-r16                                INTEGER (1..32)   OPTIONAL, -- Need S
        ...
    },
    semi-persistent-r16                           SEQUENCE {
```

A positioning SRS-resource definition according to release 16 is illustrated in FIG. 12.

According to release 16, the field Spatial Relation Info Pos may be defined as:

Other embodiments comprise the computer program for performing one of the methods described herein, stored on a machine readable carrier.

```
SRS-SpatialRelationInfoPos-r16 : :-    SEQUENCE      {
        servingCellId-r16                  ServCellIndex     OPTIONAL,  -- Need S
referenceSignal-r16                        CHOICE        {
    ssb-IndexServing-r16                       SSB-Index,
    csi-RS-IndexServing-r16                    NZP-CSI-RS-ResourceId,
    srs-SpatialRelation-16                     SEQUENCE {
        resourceSelection-r16                      CHOICE {
            srs-ResourceID-r16                         SRS-ResourceID
            srs-PosResourceID-r16                      SRS-PosResourceID-r16
        }
        uplinkBWP-r16                              BWP-Id
    },
ssbNcell-r16                           SSB-InfoNcell-r16,
```

Embodiments may be applicable, in particular, in 5G networks, in mmWave applications, in multi beam transmission and reception environments or other wireless networks. Embodiments allow to enhance UE and network efficiency In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Abbreviations

| Abbreviation | Meaning |
| --- | --- |
| 3GPP | Third generation partnership project |
| NR | New radio |
| SRS | Sounding reference signal |
| UE | User equipment |
| RP | Reception point |
| LMU | Location measurement unit |
| gNB | Next Generation Node-B |
| TRP | Transmission Reception Point |
| OTDoA | Observe Time Difference of Arrival |
| LMF | Location Management Function |
| PRS | Position Reference Signal |
| RTT | Round Trip Time |
| RTOA | Relative Time of Arrival |
| NW | Network |

REFERENCES

| Reference Label (use Word bookmarks) | Details |
| --- | --- |
| TS 38.214 | 3GPP TS 38.214: "NR; Physical layer procedures for data" v16.1.0 |
| TS 38.331 | 3GPP TS 38.331: "NR; Radio Resource Control (RRC); Protocol specification" v16.0.0 |
| TS 37.355 | 3GPP TS 38.331: "LTE Positioning Protocol (LPP)" v16.0.0 |

The invention claimed is:

1. A user equipment (UE) configured for operating in a wireless communication network that supports a plurality of reference signals (RS), the UE comprising:
   a wireless interface configured for transceiving signals, comprising receiving a configuration signal having a configuration information indicating a reference spatial relation and a spatial relation;
   a controller for evaluating the configuration information and to determine the reference spatial relation;
   wherein the UE is configured for using the reference spatial relation as a reference for an uplink RS (UL-RS) in the wireless communication network using the spatial relation for an uplink RS (UL-RS) transmission, and, in a case when the spatial relation is not configured, using the reference spatial relation comprising a default beam configuration to activate a spatial TX filter for the UL-RS transmission based on a channel condition.

2. The UE of claim 1, wherein the UE is configured to assume the reference spatial relation as an Rx spatial filter acquired from an SS/PBCH block of a serving cell that the UE uses to acquire MIB in a case when the reference spatial relation is not configured.

3. The UE of claim 1, wherein the reference spatial relation is providing a reference for the target UL-RS transmission and unlike spatialRelationInfo, the UE is not expected to transmit target UL-RS within the spatial filter information of the reference RS.

4. The UE of claim 1, wherein the UE is configured to assume the reference spatial relation as an Rx spatial filter acquired from an SS/PBCH block of a serving cell that the UE uses to acquire MIB in a case when the reference spatial relation is not configured; and wherein the reference spatial relation is providing a reference for the target UL-RS transmission and unlike spatialRelationInfo, the UE is not expected to transmit target UL-RS within the spatial filter information of the reference RS.

5. The UE of claim 1, wherein the UE is configured for using a sensor of the UE for acquiring an orientation estimate for the UE; and for using the orientation estimate and the reference spatial relation in order to adjust its frame of reference to that of a global one, and to then use this adjusted frame of reference as its new zero point for performing a beam sweep and/or for interference mitigation.

6. The UE of claim 1, wherein the UE is configured for transmitting the UL-RS using a spatial TX filter and for determining the spatial TX filter based on the reference spatial relation; and/or
   wherein the UE is configured for transmitting a plurality of UL-RS comprising the uplink RS along a plurality of associated different directions and for excluding an UL-RS associated with a direction that is associated with the reference spatial relation from transmission.

7. The UE of claim 1, wherein the UE is configured for receiving instructions for using at least one resource set each resource set having at least one resource and for transmitting at least the UL-RS in accordance with the instructions.

8. The UE of claim 1, wherein the UE is configured for transmitting a signal indicating the UL-RS to a different device to thereby instruct the different device to transmit the UL-RS on behalf of the UE.

9. The UE of claim 1, adapted to store information indicating a spatial relation between a reference RS and the target UL-RS, wherein UE is configured with respect to a spatial relation information for the UL RS in a first state and for using the reference spatial relation to derive a spatial filter for the UL-RS in the first state, wherein the configuration signal comprises information indicating the reference RS.

10. The UE of claim 1, wherein the UE is configured for determining a spatial RX filter acquired from a SS/PBCH block of a cell of the wireless communication network that serves the UE and for using the spatial RX filter as the reference spatial relation.

11. The UE of claim 1, wherein the UE is adapted to use a first plurality of resource sets for transmitting a second plurality of UL-RS from the plurality of RS, each resource set having at least one resource for transmitting an UL-RS of the plurality of UL-RS, wherein the UE is configured for performing a power control of a transmission power for transmitting the UL-RSs individually for a first resource set of the plurality of resource sets and a second resource set of the plurality of resource sets.

12. The UE of claim 11, wherein the UE is adapted, for performing the power control, to determine a transmission power to be used for the first resource set or the second resource set based on at least one of
- information indicating a position of the UE and based on a position;
- information indicating a position of a dedicated receiver of the UL-RS; and
- information indicating a channel condition between the UE and the dedicated receiver.

13. The UE of claim 11, wherein the UE is configured for transmitting the UL-RS towards a dedicated TRP and for performing the power control for the first resource set or the second resource set comprising a resource used for transmitting the UL-RS to the dedicated reception point (RP) using a pathloss reference with respect to a reference RP.

14. The UE of claim 11, wherein the UE is configured for using a scaling parameter to scale the transmission power between the first resource set and the second resource set and/or an offset parameter to offset the transmission power between the first resource set and the second resource set.

15. The UE of claim 1, wherein the UE is configured for receiving instructions from the wireless network to update or deactivate a use of the reference spatial relation; wherein the UE is configured for operating according to the instructions.

16. The UE of claim 15, wherein the UE is configured for receiving the instructions as predictive instructions related to a future position or orientation and for implementing the instructions at the future position or orientation.

17. The UE of claim 15, wherein the UE is configured for receiving information indicating a directional relation of the UE and/or power control related to a future predicated window; wherein the UE is configured for determining a change of a UE position or orientation in the wireless communication network and to adapt a parameter, e.g., a spatial filter or a power setting, used for transmitting the UL-RS based on the received information.

18. The UE of claim 1, wherein the UE is configured for updating the reference spatial relation;
wherein the UE is configured for transmitting UL-RSs on at least a first time instant and a later second time instance and for using, at the first time instance the UL-RS along a default direction based on a channel condition of the UE and for updating the reference spatial relation for the second time instance based on a changed channel condition.

* * * * *